United States Patent [19]
Iwawaki et al.

[11] Patent Number: 6,033,204
[45] Date of Patent: Mar. 7, 2000

[54] FLAT BLOW MOLDING MACHINE, FLAT BLOW METHOD AND PRODUCTS OF FLAT BLOW MOLDING

[75] Inventors: Akira Iwawaki; Satoshi Araki; Yoshiharu Shitara, all of Yokohama; Yoshinori Umezawa, Ebina; Takashi Shimizu, Hiratsuka, all of Japan

[73] Assignee: Ishikawajima-Harima Heavy Industries Co., Ltd., Tokyo, Japan

[21] Appl. No.: 09/000,913

[22] Filed: Dec. 30, 1997

Related U.S. Application Data

[62] Continuation of application No. 08/585,807, Jan. 16, 1996, abandoned, which is a continuation of application No. 08/167,868, filed as application No. PCT/JP93/00509, Apr. 20, 1993, abandoned.

[30] Foreign Application Priority Data

| Apr. 20, 1992 | [JP] | Japan | 4-99708 |
| May 20, 1992 | [JP] | Japan | 4-127459 |
| May 14, 1992 | [JP] | Japan | 4-122111 |
| May 26, 1992 | [JP] | Japan | 4-133624 |
| Jun. 22, 1992 | [JP] | Japan | 4-162993 |
| Jul. 2, 1992 | [JP] | Japan | 4-175492 |

[51] Int. Cl.[7] ............ B29C 47/22; B29C 49/42
[52] U.S. Cl. ............ 425/192 R; 425/190; 425/466; 425/532; 264/177.16; 264/540
[58] Field of Search .......... 425/532, 461, 425/466, 190, 192 R, 168, 183, 185, 380, 381; 264/540, 541, 177.1, 177.16, 209.8

[56] References Cited

U.S. PATENT DOCUMENTS

| 1,508,773 | 9/1924 | Brown | 425/466 |
| 3,317,955 | 5/1967 | Schurman | 425/532 |
| 3,929,951 | 12/1975 | Shibata et al. | |
| 4,113,411 | 9/1978 | Terragni | |
| 4,124,351 | 11/1978 | Garbuio | 425/532 |
| 4,432,718 | 2/1984 | Wurzer | 264/541 |
| 5,057,267 | 10/1991 | Seizert et al. | 264/541 |
| 5,273,421 | 12/1993 | Kanoh et al. | 425/532 |

FOREIGN PATENT DOCUMENTS

| 3000444 | 7/1981 | Germany. | |
| 43-11552 | 5/1943 | Japan. | |
| 49-36387 | 10/1973 | Japan. | |
| 58-96528 | 6/1983 | Japan | 425/532 |
| 62-174128 | 7/1987 | Japan | 425/532 |
| 4-286605 | 10/1992 | Japan | 425/466 |

OTHER PUBLICATIONS

Patent Abstracts of Japan, vol. 12, No. 325 (M–737)(3172) JP–A 63–092,416 (Ishikawajima Harima Heavy Ind.), Sep. 1988.

Patent Abstracts of Japan, vol. 15, No. 350 (M–1154) JP–A 3–136,827 (Ube Ind. Ltd.), Jun. 1991.

*Primary Examiner*—Catherine Timm
*Attorney, Agent, or Firm*—Tung & Associates

[57] ABSTRACT

A flat blow molding machine adapted to extrude flat hollow parison from clearance between a flat core and a flat die surrounding the core, characterized in that both ends of the die are slidable in a width direction with respect to a center, the core is replaceable in accordance with expansion and contraction of the die in the width direction. According to this construction, it is possible to change the width of the flat hollow parison extruded from the clearance between the core and the die by sliding the both ends of the die in the width direction and replacing the core upon expansion and contraction of the core in the width direction. Further, if the flat core is constructed from a planar replaceable portion and curved (three dimensional) non-replaceable portions and only the planar replaceable portion is exchanged upon replacement, preparing a plurality of inexpensive-to-manufacture planar replaceable portions having different lengths is enough and the cost is reduced. Accordingly, the width of the hollow flat parison extruded from the clearance between the flat core and the flat die can be changed.

6 Claims, 30 Drawing Sheets

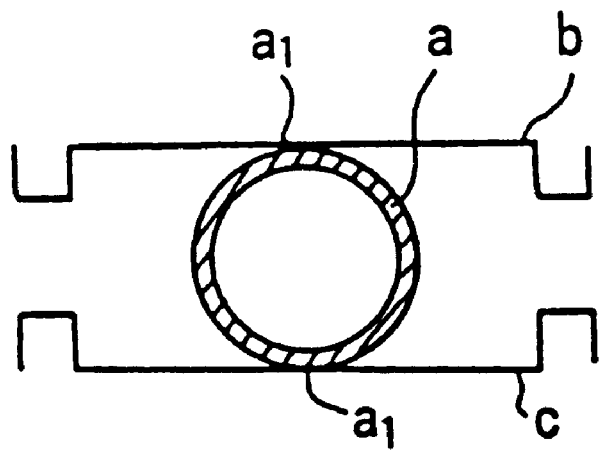
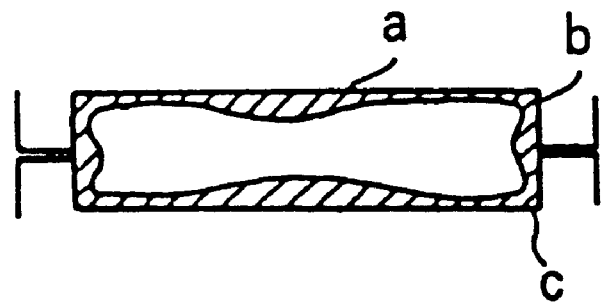
FIG. 33
(PRIOR ART)

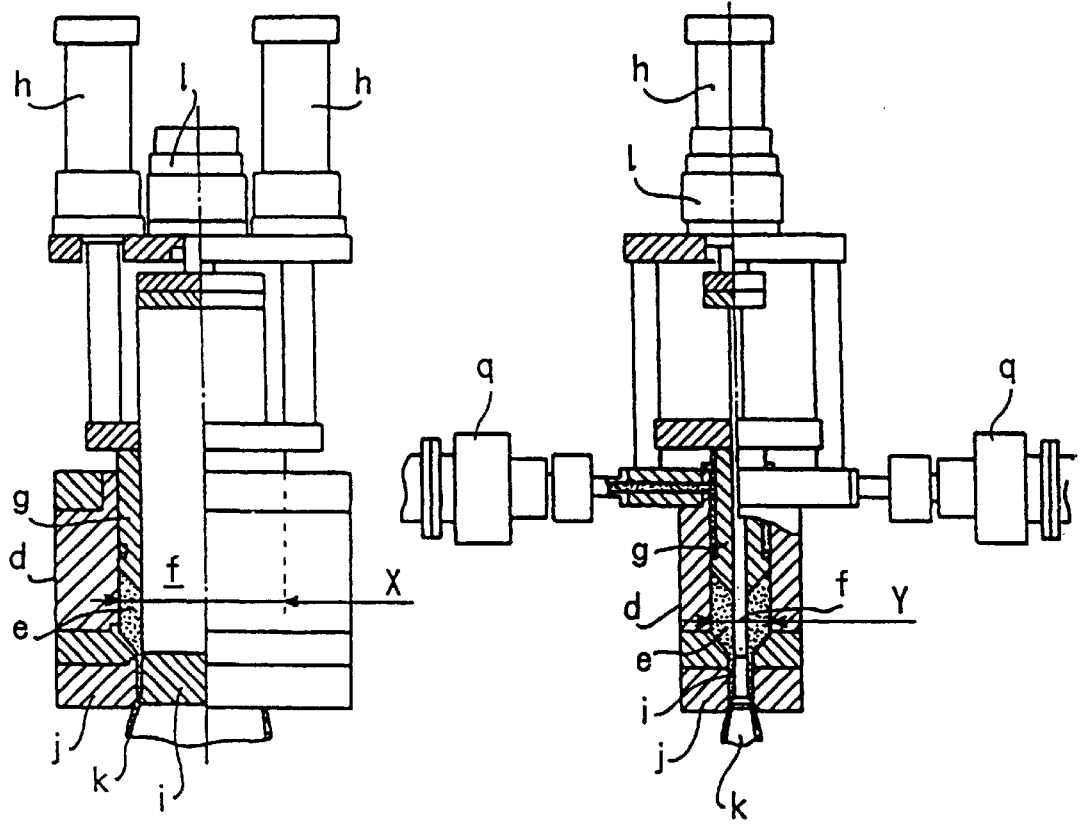
FIG. 34(a) (PRIOR ART)
FIG. 34(b) (PRIOR ART)
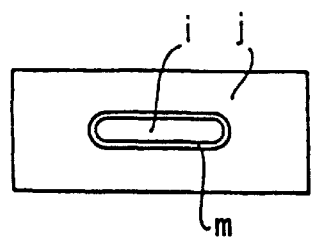
FIG. 34(c) (PRIOR ART)

FLAT BLOW MOLDING MACHINE, FLAT BLOW METHOD AND PRODUCTS OF FLAT BLOW MOLDING

This is a continuation of application Ser. No. 08/585,807 filed on Jan. 16, 1996 now abandoned, which is a continuation of 08/167,868, filed Jan. 27, 1994 now abandoned, which is a 371 of PCT/JP93/00509 filed Apr. 20, 1993

TECHNICAL FIELD

The present invention relates to a flat blow molding machine, a flat blow molding method and products of flat blow molding to obtain flattened products.

BACKGROUND ART

In recent years, thin and hollow flattened products such as heat collecting plates of a solar water-heating device, casings of office automation equipments, panels, furnitures and interior decorations are experimentally blow molded. In such cases, as shown in FIG. 33 of the accompanying drawings, cylindrical parison "a" is extruded downward, sandwiched by thin metallic molds "b" and "c" from left and right and air is blown therein, as a common blow molding machine does. As a result, the parison "a" expanded due to air injection is fixed at its part "a1" which first contacts an inner wall of the metallic mold and expands therefrom to left and right so that a product having a uniform thickness (wall thickness) cannot be obtained. Thereupon, the present applicant previously developed a flat blow molding machine which does not extrude the cylindrical parison "a", but extrudes hollow flattened parison, that matches an inner wall of thin metallic molds "b" and "c", from clearance between a planar flattened core and a flattened die surrounding the core so as to mold a hollow plate-like product having a uniform thickness.

This type of flat blow molding machine is constructed as follows, as shown in FIG. 34: an accumulator chamber "e" whose section is flattened is formed in a housing "d" in a vertical direction, a planar flattened mandrel "f" is vertically provided at the center of the accumulator chamber "e" and a flattened piston "g" is fitted over the flattened mandrel "f". The flattened piston "g" is lowered by a hydraulic cylinder "h" to pressurize the resin in the accumulator chamber "e" and the pressurized resin is extruded in the form of hollow flattened parison "k" from clearance between a flattened core "i" provided at a tip of the flattened mandrel "f" and a flattened die "j" provided at a lower end of the housing "d". The resin is fed to the accumulator chamber "e" from extruders "q" provided on left and right sides in its thickness Y direction. The flattened parison "k" extruded as shown in FIG. 35 is sandwiched by flattened metallic molds (not shown) in a direction perpendicular to the drawing sheet and air is blown therein.

However, conventional flat blow molding machines have the following problems:

(1) since the width of the extruded parison "k" cannot be adjusted, an unnecessary portion of the extruded flattened parison "k" should be collapsed by the metallic mold and the molded products inevitably have flashes when flattened products having a width smaller than the width of the parison "k" should be manufactured. In other words, a flash ratio is raised and this is not economic;

(2) in order to blow mold two products each having a width smaller than the flattened parison "k", unnecessary parison "k" should be collapsed by the metallic mold and the products should have flashes, as shown in FIG. 36. Specifically, in order to obtain two molded products having a reduced width "n" and "o", the unnecessary parison "k" between these two products "n" and "o" should be crashed by the metallic mold so that unduly large flashes "p" are produced. Therefore, this is not preferred if material expense and manufacturing cost are concerned, i.e., it raises problems in terms of resource saving and energy saving;

(3) since two extruders "q"s are located left and right in the width Y direction of the flattened accumulator chamber "e" having a width X and a thickness Y and the resin extruded therefrom is introduced to the accumulator chamber "e" from a center of left and right flattened faces of the flattened piston "g", the resin pressure in the accumulator chamber "e" does not become uniform. Specifically, since the resin pressure at the center in the width X direction of the flattened accumulator "e" is relatively high due to small clearance to the extruder "q", the resin pressure at ends in the width X direction of the flattened accumulator chamber "e" is low due to large clearance to the extruder "q". In this manner, the resin which fills the flattened accumulator "e" has a pressure distribution that is high at the center and low at both ends in the width X direction. Accordingly, if such resin is injected from an injection opening "m" between the flattened die "j" and the flattened core "i", the extruded flattened parison will have bending caused by the above-mentioned pressure profile;

(4) the flattened mandrel "f" is moved up and down by an actuator "l" during the injection of the flattened parison "k" to adjust the clearance between the flattened core "i" and the flattened die "j" (gap control) and to control the thickness of the parison "k" in the injection direction. In this case, since the accumulator chamber "e" is filled with the resin, the flattened mandrel "f" should be moved up and down with a force overcoming the resin pressure. However, the flattened mandrel "f" which is molded to be a wide and planar one easily bends due to insufficient rigidity. Further, the flattened mandrel "f" may be offset from the center of the accumulator chamber "e" in a range of slide face allowance of the flattened piston "g" and the flattened mandrel "f". If the flattened mandrel "f" is offset or bends as mentioned above, the clearance between the flattened core "i" located at the tip of the mandrel "f" and the flattened die "j" located at the lower end of the housing "d" varies so that the thickness of the injected flattened parison "k" becomes non-uniform. This makes a bending portion in a product so that sound blow molding cannot be expected. In addition, this causes abnormal abrasions and scratching on the slide face;

(5) in order to avoid mixing of colors and/or materials upon change of color and/or material of the resin (parison), the housing should be disassembled and the resin adhering on the interior should be cleaned off. For example, if the color of the resin is changed to white from black, a trace amount of black resin remaining in the housing may cause the color mixing in a product. Thus, the resin adhering on the interior of the housing must be completely removed. However, disassembling the housing of the blow molding machine requires a large crane and/or a complicated lifting device so that operations are troublesome and take time. In case of color change or material change, alternatively, the resin is allowed to flow out of the molding machine till the color or the material of the injected parison changes, instead of disassembling and cleaning the housing. However, this requires a large amount of resin for replacement if the resin should be replaced to low viscosity resin from high viscosity resin or white resin from black resin. Further, this approach may result in color and material mixing in the product so that it is not employable and is extremely costly;

(6) the injected hollow flattened parison "k" expands due to swell effect of the resin as shown in FIG. 37 upon injection to the atmosphere from the accumulator chamber "e" of high pressure. Specifically, it expands from the injection opening "m" between the flattened die "j" and the flattened core "i" shown in FIG. 34(c), with a short edge-to-long edge ratio of its section being reduced. Therefore, the expanded parison "k" does not match the inner wall of the thin metallic molds "b" and "c" so that a blow molded product has a non-uniform thickness with an unnecessarily large thickness, like a case of circular parison. Moreover, if the injected flattened parison "k" has vertical wrinkles, pre-blow should be performed to eliminate them. However, if pre-blow air pressure is applied to the interior of the flattened parison "k", not only the swell effect but also the pre-blow air pressure cause the parison to expand. Thus, the parison "k" has an oval or circular section. In this case, the meaning of injecting the flattened parison "k" using the flattened die "j" and the flattened core "i" is lost. Further, if the flattened die "j" and core "i" having a large flattened ratio are used to inject the flattened parison "k", the resin section of the flattened parison "k2" injected as shown in FIG. 38 changes its shape due to the swell effect and drawdown. In this case, the left and right inner faces "k1" of the parison "k" may be fused and joined with each other in the direction of injection. This disables the blow molding; and (7) a curved (three dimensional) duct which has a plurality of passages in the longitudinal direction is employed in the fields of automobiles, house-use electric devices, sanitary equipments or the like. Conventionally, when this type of curved duct is manufactured by the blow molding, a plurality of parison is injected from a plurality of injection heads, part or all of which are fused. Alternatively, both sides of the parison injected into the metallic mold are sandwiched and pressed by pushing plates extending in the direction of injection to fuse the parison at the tip of the pushing plates. However, in the former approach, the apparatus becomes large since it employs a multi-injection head, and in the latter approach, grooves formed upon drawing of the pushing plates out of the parison deteriorate the strength and the appearance of the product.

A first object of the present invention which is developed in consideration of the above is to provide a flat blow molding machine which can change width of flattened parison injected from the molding machine.

A second object is to provide a flat blow molding machine which can reduce unnecessary flashes to raise the productivity when manufacturing a product having a width smaller than flattened parison injected from clearance between a flattened die and a flattened core.

A third object is to provide a flat blow molding machine which can uniformalize resin pressure in an accumulator chamber in a width direction so as to inject flattened parison having no bending.

A fourth object is to provide a flat blow molding machine which prevents bending and offsetting of a flattened mandrel so as to inject flattened parison having uniform thickness (wall thickness) and no bending.

A fifth object is to provide a blow molding machine which allows division of a housing for easy cleaning when color and/or material of the resin should be changed.

A sixth object is to provide blow molding method, apparatus and products which can prevent the injected hollow flattened parison from being deformed due to the swell effect and drawdown.

A seventh object is to provide curved blow molding method and product which can manufacture products using a small molding machine without deteriorating strength and appearance when a curved (three dimensional) blow molded product whose interior is divided in the direction of injection is manufactured.

DISCLOSURE OF THE INVENTION

To achieve the first object, a first invention provides a flat blow molding machine which injects hollow flattened parison from clearance between a flattened core and a flattened die surrounding the core, characterized in that both ends of the die are slidable with respect to its center in a width direction and in that the core is replaceable (or interchangeable) upon expansion/contraction of the die in the width direction. The flattened core may include a planar replaceable part located at the center and curved non-replaceable parts located at the ends, and only the replaceable part may be replaced upon expansion/contraction of the die in the width direction.

According to this construction, if the ends of the die are slid in the width direction respectively and the core is appropriately replaced upon the expansion/contraction of the die in the width direction, it is possible to change the width of the hollow flattened parison to be injected from the clearance between the core and the die. Further, if the flattened core includes a replaceable planar part and non-replaceable curved parts and only the replaceable part is loaded and unloaded, the cost is reduced since preparing a plurality of replaceable planar parts having different lengths, which are less costly to manufacture, is sufficient.

Therefore, it is possible to change the width of the hollow flattened parison injected from the clearance between the flattened core and the flattened die.

To achieve the second object, a second invention provides a flat blow molding machine which injects hollow flattened parison having an enlarged width from clearance between a planar flattened core and a flattened die surrounding the core, characterized in that the flat core is divided into a plurality of pieces in the width direction and an intermediate piece is located between each adjacent core pieces such that the core pieces and the intermediate pieces form parison injection openings.

According to this construction, the hollow flattened parison injected from the clearance between the flattened die and the flattened core is divided by the intermediate pieces so that a plurality of flattened parison is simultaneously injected. At this point, no parison is injected below the intermediate pieces so that flashes are reduced to the minimum and cost is in turn reduced. Further, if the width and the number of the intermediate pieces are changed with the width of the product, it is possible to cope with various kinds and widths of products and the productivity is improved.

Therefore, it is possible to reduce unnecessary flashes which are produced by a conventional molding method when a product of relatively small width is molded. Accordingly, resource saving and energy saving are promoted. In addition, if the width and the number of the intermediate pieces are changed in line with the width of the products, a single molding machine is able to cope with products of various widths. This improves the productivity.

To achieve the third object, a third invention provides a flat blow molding machine wherein an accumulator chamber having a flattened section is vertically formed in a housing, a planar flattened mandrel is located at a center of the accumulator chamber, a flattened piston is fit over the flattened mandrel and the flattened piston is lowered to press resin in the accumulator chamber so that the resin is injected in the form of hollow flattened parison from clearance between a flattened core located at a tip of the flattened mandrel and a flattened die located at a lower end of the housing, characterized in that a plurality of resin supply passages are formed in the housing at intervals in a width direction of the accumulator chamber for guiding the resin into the accumulator chamber and in that a flow rate control valve is provided in each resin supply passage. - - - (1)

Further, there may be provided a flat blow molding machine wherein an accumulator chamber having a flattened section is vertically formed in a housing, a planar flattened mandrel is located at a center of the accumulator chamber, a flattened piston is fit over the flattened mandrel and the flattened piston is lowered to press resin in the accumulator chamber so that the resin is injected in the form of hollow flattened parison from clearance between a flattened core located at a tip of the flattened mandrel and a flattened die located at a lower end of the housing, characterized in that a resin supply groove is vertically formed in a lateral face of the flattened piston and in that a resin distributing groove which expands downward like a hanger (or fan) in a width direction of the accumulator chamber is formed at a lower end of the resin supply groove. - - - (2)

According to the construction of (1), the resin filled in the flattened accumulator chamber flows through the resin supply passages formed at intervals in the width direction of the accumulator chamber and reaches the accumulator chamber while its flow rate being appropriately adjusted by the flow rate control valves in the respective supply passages. Owing to this, the resin pressure in the accumulator chamber becomes substantially uniform in the width direction thereof so that it is possible to inject flattened parison having no bending.

According to the construction of (2), the resin flowing in the resin supply groove, which is formed vertically in the lateral face of the flattened piston, and directed to the flattened accumulator chamber below the groove passes through the hanger-type resin distribution groove subsequent to the supply groove to be distributed in the width direction and reaches the flattened accumulator chamber. This substantially uniformalizes the resin pressure in the accumulator chamber in the width direction thereof so that it is possible to inject flattened parison having no bending.

Therefore, the pressure of the resin filled in the accumulator chamber becomes substantially uniform in the width direction and accordingly it is possible to inject hollow flat parison without bending.

To achieve the fourth object, a fourth invention provides a flat blow molding machine wherein an accumulator chamber having a flattened section is vertically formed in a housing, a planar flattened mandrel is vertically located at a center of the accumulator chamber, a flattened piston is fit over the flattened mandrel and the flattened piston is vertically moved to press resin in the accumulator chamber so that the resin is injected in the form of hollow flattened parison from clearance between a flattened core located at a tip of the flattened mandrel and a flattened die located at a lower end of the housing, characterized in that presser rolls are provided at left and right ends of the flattened mandrel above the accumulator chamber for sandwiching the flattened mandrel to prevent deflection and offsetting of the flattened mandrel and in that an actuator is provided for separating the presser roll from the flattened mandrel to prevent contact of the flattened piston with the presser rolls when the flattened piston is in a raised position.

According to the above construction, the presser rolls sandwich the flattened mandrel above the accumulator chamber from left and right so that the position of the flattened mandrel is maintained at the center of the accumulator chamber. Therefore, the deflection and offsetting of the flattened mandrel are reduced. Further, when the flattened piston extending through the flattened mandrel is raised, the actuator separates the presser rolls from the flattened mandrel so that contact and interference between the raised flattened piston and the presser rolls are prevented.

As mentioned above, since the deflection and offsetting of the flattened mandrel are prevented, it is possible to inject flattened parison having a uniform thickness (wall thickness) and no bending.

To achieve the fifth object, a fifth invention provides a flat blow molding machine wherein an accumulator chamber filled with resin is vertically formed in a housing and the resin in the accumulator chamber is pressed by a piston to inject the resin in the form of hollow parison from clearance between a core and a die surrounding the core, characterized in that the housing is divided into right and left housing pieces in a height direction of the accumulator chamber and in that an actuator is provided for separating/combining these right and left housing pieces.

According to the above construction, when color and/or material of the resin (parison) is changed, the accumulator chamber is divided to the right and left housing pieces by the actuator and the resin adhering inside can be removed. This considerably simplifies cleaning of the interior.

Therefore, it is possible to divide the housing and easily clean the resin adhering inside when the color and/or material of the resin should be changed. As a result, a large amount of resin used for replacing the resin at the time of color/material change becomes unnecessary and the expense is reduced.

To achieve the sixth object, a sixth invention provides a flat blow molding method for injecting parison in the form of wide and hollow flattened parison from clearance between a planar flattened core and a flattened die surrounding the core, characterized in that a plurality of resin passage grooves which connect left and right faces of the core are formed at the tip of the flattened core in parison injecting direction and at intervals in a width direction of the core and in that the resin which has passed the resin passage grooves forms partition walls in the hollow flattened parison as the hollow flattened parison is injected from the clearance between the flattened core and the flattened die surrounding the core.

Further, the present invention provides a flat blow molding machine for injecting parison in the form of wide and hollow flattened parison from clearance between a planar flattened core and a flattened die surrounding the core, characterized in that a plurality of resin passage grooves connecting left and right faces of the core are formed at the tip of the flattened core in parison injecting direction and at intervals in the width direction of the core to form partition walls in the injected hollow flattened parison.

In addition, the present invention provides a blow molded product which is made by injecting parison in the form of wide and hollow flattened parison from clearance between a planar flattened core and a flattened die surrounding the core, sandwiching the parison by a metallic mold and injecting air inside, characterized in that the product is made by forming a plurality of resin passage grooves connecting left and right faces of the core at the tip of the flattened core in parison injecting direction and at intervals in the width direction of the core, injecting the hollow flattened parison from the clearance between the flattened core and the flattened die surrounding the core, forming a plurality of partition walls at intervals in the width direction inside the hollow flattened parison using the resin which has passed the resin passage grooves, sandwiching the parison by the metallic mold and injecting air therein.

According to the above, since a plurality of partition walls are formed inside the hollow flattened parison injected from the clearance between the flattened core and the flattened die at intervals in the width direction, deformations of the hollow flattened parison due to the swell effect and drawdown of the injected resin are suppressed by the partition walls so that a sound thin hollow blow-molded product is obtained.

Therefore, it is possible to prevent the injected hollow flattened parison from being deformed due to the swell effect and drawdown and to obtain a sound thin hollow flattened blow-molded product.

To achieve the seventh object, a seventh invention provides a flat blow molding method for injecting hollow circular parison from clearance between a cylindrical core and a cylindrical die surrounding the core, sandwiching the parison by a metallic mold and injecting air in the parison, characterized in that resin passage grooves which guide the resin from a lateral face of the core toward a center of the core are radiantly formed at a tip of the core in parison injection direction, in that a partition wall is formed by the resin, which passes the resin passage grooves, inside the hollow circular parison as the hollow circular parison is injected from the clearance between the core and the die surrounding the core, and in that the parison is air blown in the metallic mold.

Further, the present invention provides a blow molding machine wherein hollow circular parison is injected from clearance between a cylindrical core and a cylindrical die surrounding the core, the parison is sandwiched by a metallic mold and air is blown in the parison, characterized in that resin passage grooves for guiding the resin from a lateral face of the core toward a center of the core are radiantly formed at a tip of the core in parison injection direction to form a partition wall inside the injected hollow circular parison.

In addition, the present invention provides a blowmolded product which is generally made by injecting hollow circular parison from clearance between a cylindrical core and a cylindrical die surrounding the core, sandwiching the parison by a metallic mold and injecting air in the parison, characterized in that the product is made by radiantly forming resin passage grooves for guiding the resin from a lateral face of the core toward a center of the core at a tip of the core in parison injection direction, injecting the hollow circular parison from the clearance between the core and the die surrounding the core, form a partition wall in the hollow circular parison by the resin which passes the resin passage grooves and air blowing the parison in the metallic mold.

According to these, part of the resin on the lateral face of the core passes through the resin passage grooves formed radiantly at the core tip and is guided toward the core center as the hollow circular parison is injected from the clearance between the core and the die, so that the partition walls are formed in the hollow circular parison. As a result, unlike the conventional case, the use of multi-injection head is not necessary so that the apparatus can be designed compact as a whole. Further, trace of grooves do not remain in a product which is conventionally produced when the pushing plate is drawn out of the parison. This improves appearance and strength.

Therefore, it is possible to manufacture a blow-molded product whose interior is divided in the injection direction using an apparatus smaller than before without deteriorating the strength and appearance of the product.

BRIEF DESCRIPTION OF THE DRAWINGS

FIG. 1 is a set of illustrations useful to explain major part of a flat blow molding machine according to one embodiment of a first present invention, in which

FIG. 25 is a set of views showing a tip of a flat core of the flat blow molding machine shown in FIG. 23, in which FIG. 25(a) shows a lateral view, FIG. 25(b) shows a sectional view taken along the line b—b and FIG. 25(c) shows a sectional view taken along the line c—c;

FIG. 33 is a view useful to explain a conventional flat blow molding machine;

FIG. 34 is a set of views showing a flat blow molding machine which is previously developed by the present applicant, in which (a) is a front view, (b) is a lateral view and (c) is a bottom view;

BEST MODES TO CARRY OUR THE INVENTION (1) Now, an embodiment according to a first invention will be explained with reference to FIGS. 1–6.

Figure 2:
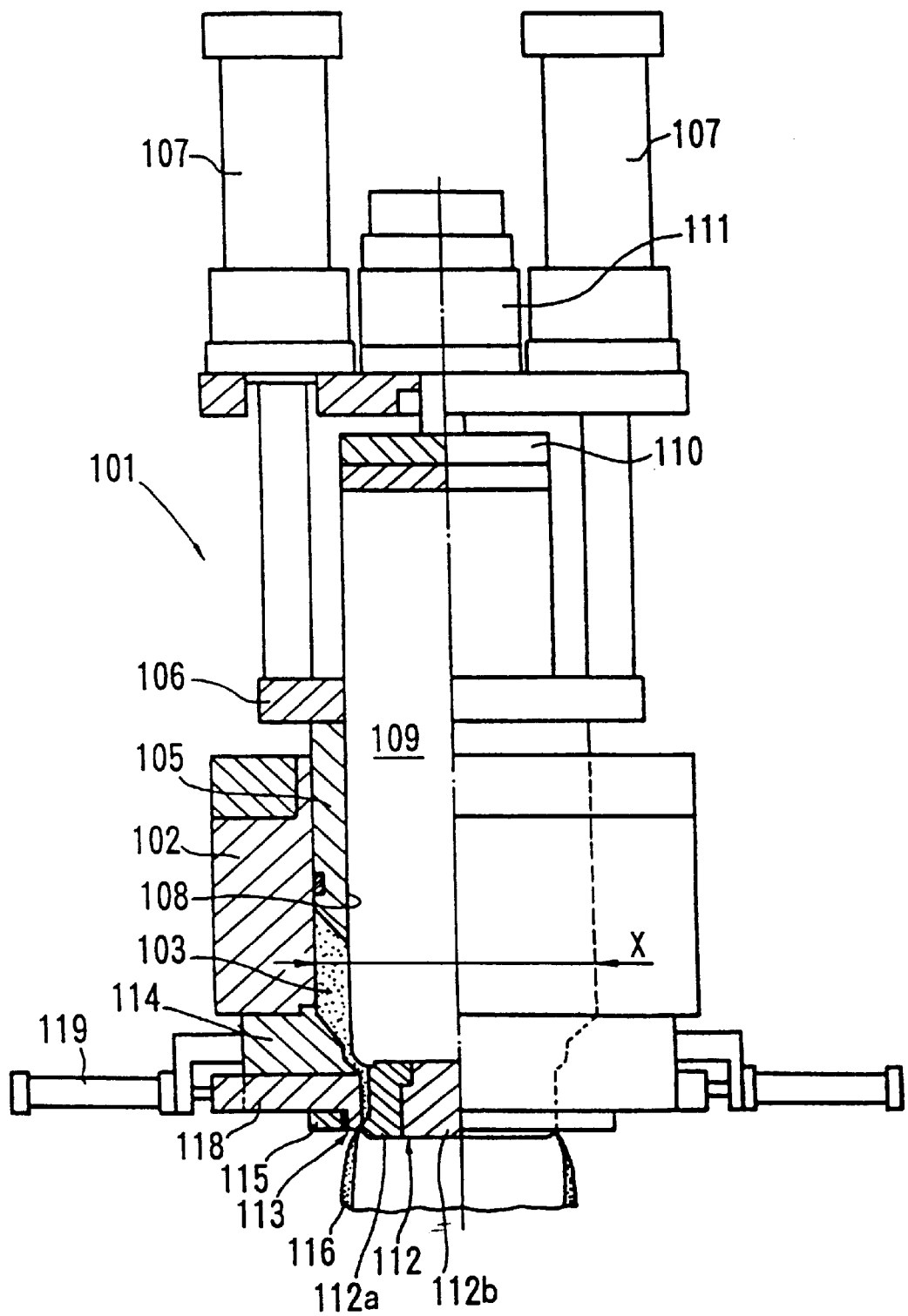
FIG. 2 is a partially cut front view of the flat blow molding machine shown in FIG. 1.
Figure 3:
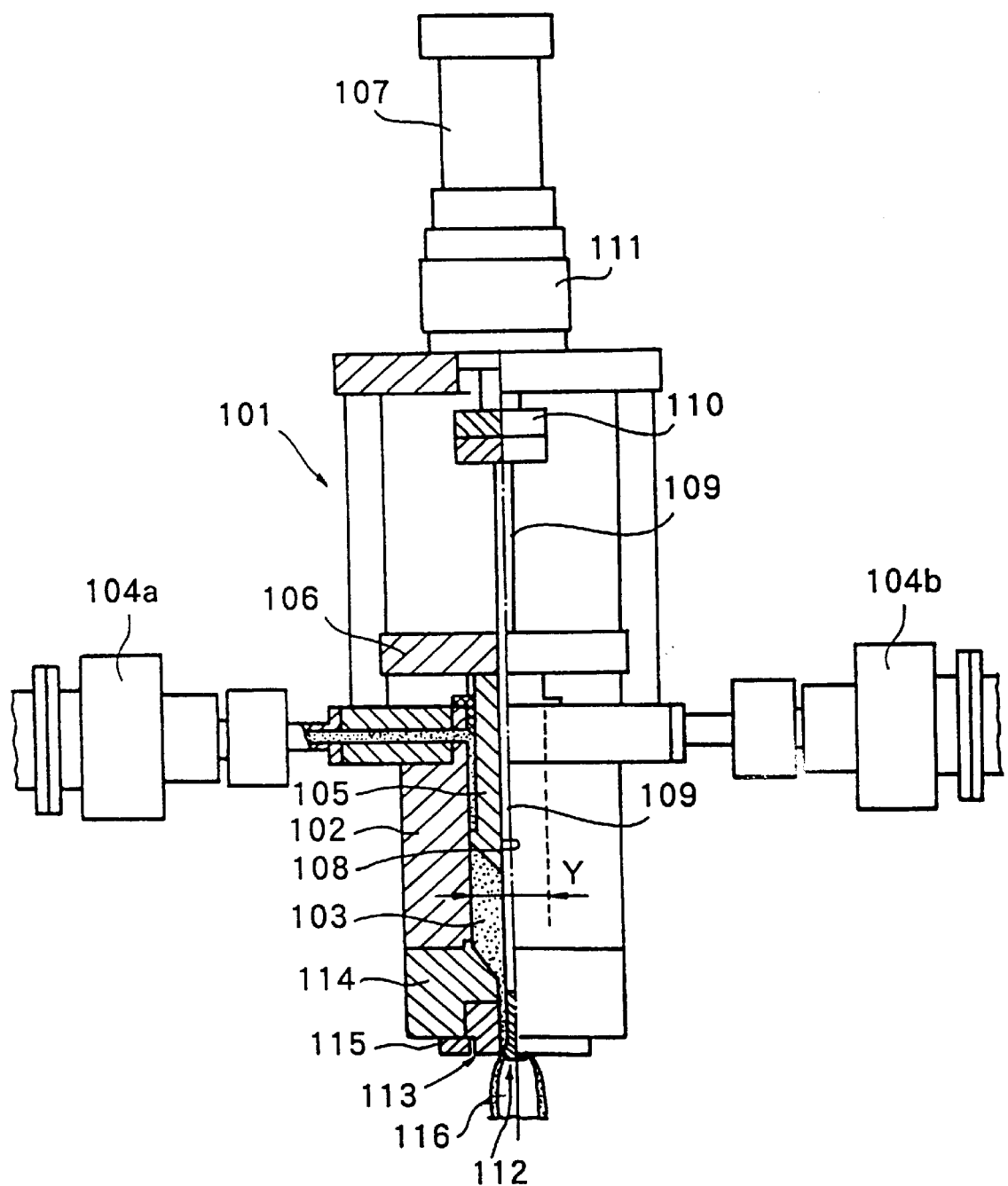
FIG. 3 is a partially cut lateral view of the flat blow molding machine shown in FIG. 1.

FIG. 2 illustrates a front view of a flat blow molding machine 101 and FIG. 3 illustrates its lateral view. As shown, a flattened accumulator chamber 103 having a width X and a thickness Y is formed in a flattened main body. Into the accumulator chamber 103, supplied is plasticized resin from two extruders 104a and 104b located left and right in the width Y direction. It should be noted that only one extruder 104a/104b may be provided together with a distribution value (not shown) and the resin may be distributed to the accumulator chamber 103 through the distribution valve.

In the accumulator chamber 103, housed is a flattened piston 105 slidable in up and down directions. The flattened piston 105 is connected with a hydraulic cylinder 107 located above the main body 102 via an intermediate member 106. According to this construction, if the hydraulic cylinder 107 expands/contracts, the flattened piston 105 slides up and down in the accumulator chamber 103 to press the resin.

A flattened opening 108 vertically extends in the flat piston 105, and a planar mandrel 109 is inserted in the opening 108. An upper end of the mandrel 109 is connected with an actuator 111 (cylinder mechanism) above the main body via an intermediate member 110, and a flattened core 112 is mounted on a lower end of the mandrel 109. Around the flattened core 112, a flattened die 113 is installed to surround the core at prescribed clearance. The die 113 is mounted on a lower end of the main body 102 by a plate 115 via a holder 114.

According to this construction, if the flat piston 105 compresses the resin in the accumulator chamber 103, the pressed resin is extruded from the clearance between the flat die 113 and the flat core 112 as flattened parison 116. During this operation, if the actuator 111 is manipulated to move the core 109 up and down so as to adjust the clearance (gap) between the die 113 and the core 112, it is possible to control the thickness (wall thickness) of the extruded flat parison 116 in the extruding direction.

Next, the subject matters of this embodiment, i.e., the flattened die 113 and the flattened core 112 will be explained in detail with reference to FIG. 1. In FIG. 1, (a) is a front section of the flattened die 113 and the flattened core 112, (b) is a lateral section and (c) is a bottom view.

Figure 1C:
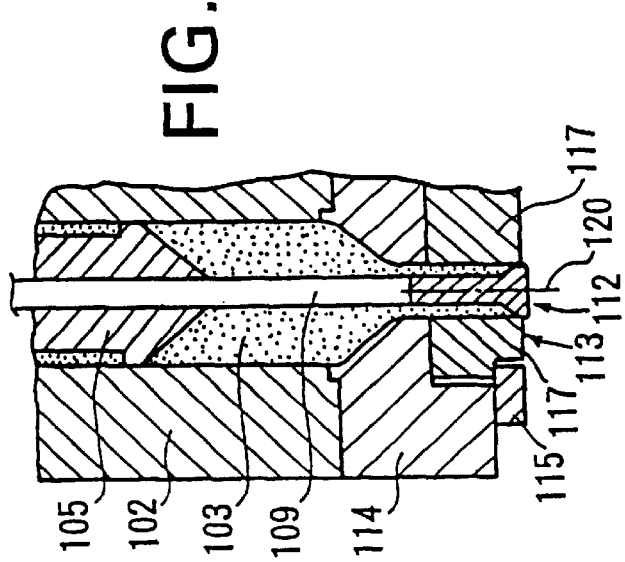
FIG. 1(b) is a lateral section and FIG. 1(c) is a bottom view.
Figure 5:
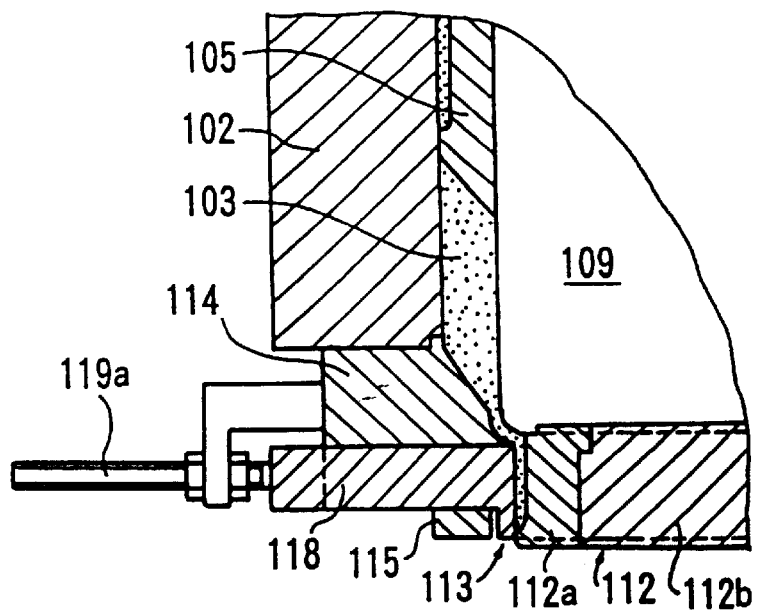
FIG. 5 shows modification of actuator for sliding a slide piece of a flattened core.

As shown in FIG. 1(c), the flattened die 113 includes a straight portion 113a at a center and corner portions 113b at ends. The straight portion 113a is constructed by two planar blocks 117 extending parallel to each other at prescribed clearance. The corner portion 113b includes a slide piece 118 slidably sandwiched by these planar blocks 117. The slide piece 118 has a U-shaped curved (three dimensional) portion 118a and is slid in a width direction by an actuator 119 (hydraulic cylinder) supported by the die holder 114. In this embodiment, a hydraulic cylinder is employed as the actuator 119. However, it is not limited to this. For example, it may be a stepping motor or a feed screw mechanism 119a as illustrated in FIG. 5. In any event, the slide piece 118 is moved by the actuator 119 in the width direction and fixed at a desired position.

Figure 1A:
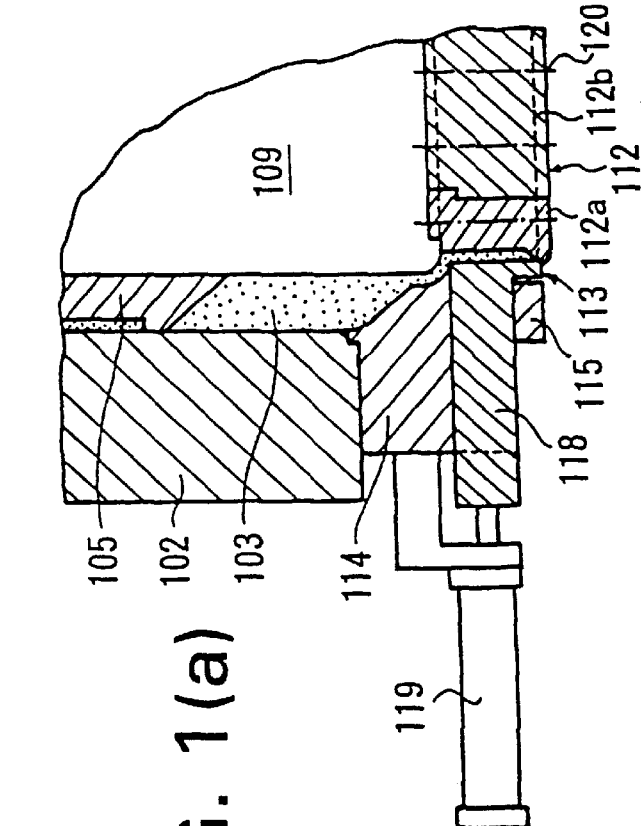
FIG. 1(a) is a front section.
Figure 1B:
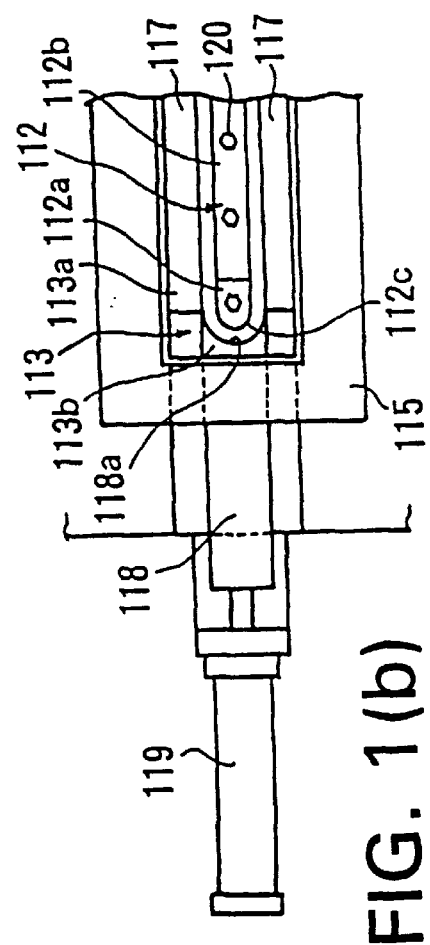
Figure 4:
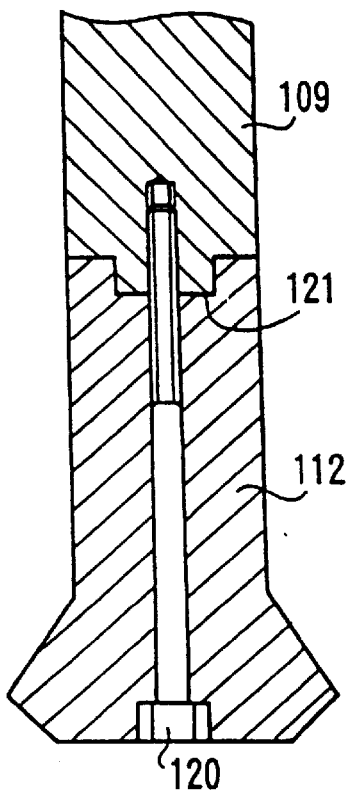
FIG. 4 is an illustration showing how a flattened core is mounted on a tip of a mandrel.

On the other hand, the core 112 is constructed by a planar replaceable (or interchangeable) portion 112b located at the center and curved non-replaceable portions 112a located at the ends, as shown in FIGS. 1(a) and (c). The replaceable portion 112a is a planar member having the same thickness as the planar mandrel 109. The non-replaceable portion 112a is a member having a projection-like curved portion 112c which engages a recess-like curved portion 118a of the slide piece 118. The replaceable portion 112b and the non-replaceable portions 112a are respectively mounted on the lower end of the planar mandrel 109 by bolts 120. This is illustrated in FIG. 4. As depicted, a connection 121 for a lower end of the flattened mandrel 109 and an upper end of the core 112 (replaceable portion 112b and non-replaceable portions 112a) is a faucet joint so that accurate positioning of these two elements is insured. It should be noted that a hexagon socket head cap screw may be employed instead of a common hexagon head bolt 120.

Figure 6:
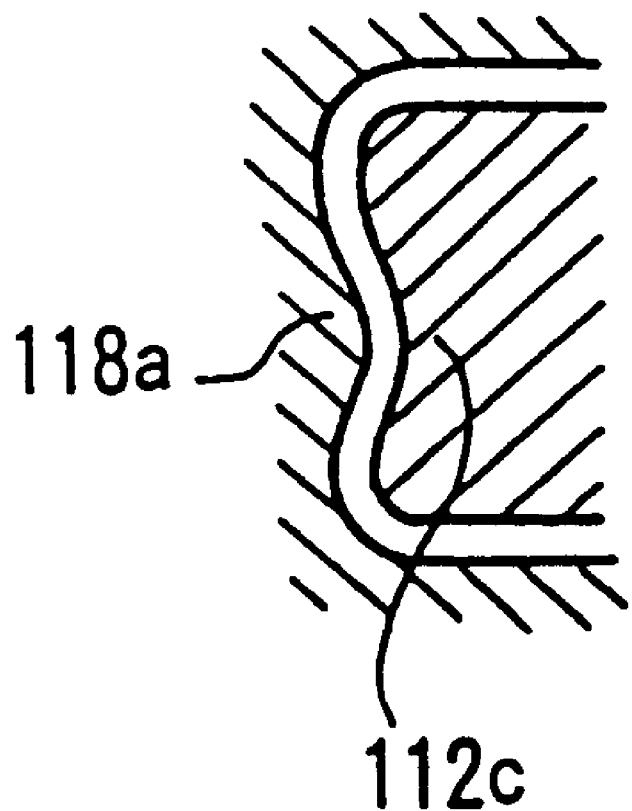
FIG. 6 shows modification of ends of the flattened core and a flattened die.

In this embodiment, the recess-like curved (three dimensional) portion 118a and the projection-like curved portion 112c are formed on the slide piece 118 of the flattened die 113 and the non-replaceable portion 112a of the flattened core 112. However, if a fact that the parison 116 expands a little upon injection of air during the blow molding is considered, the slide piece 118a and the non-replaceable portion 112a may have a wavy curved portion at their centers, respectively, as shown in FIG. 6. If this construction is employed, the concave center portion expands appropriately upon air injection so that the outer face of the parison 116 contacts the inner wall of a metallic mold substantially simultaneously. Thus, it is possible to make the thickness of the product uniform.

Now, operations of the embodiment having the above construction will be described.

According to the machine 101, the flattened parison 116 is extruded from the clearance between the flattened die 113 and the flattened core 112, as shown in FIGS. 2 and 3.

In order to reduce the width of the flattened parison 116, first the bolt 120 which mounts the flattened core 112 (replaceable portion 112b and non-replaceable portions 112a) onto the tip of the planar mandrel 109 is removed and the replaceable portion 112b and the non-replaceable portions 112a are removed from the mandrel 109. Then, one or both of left and right slide pieces of the flattened die 113 are slid by the actuator 119 such that they approach each other to reduce the width of the flattened die 113. After that, a new replaceable portion 112b which matches the reduced width of the flattened die 113 is mounted on the tip of the planar mandrel 109 by the bolt 120, and the previously removed non-replaceable portions 112a are again mounted on the ends of the mandrel by the bolt 120. To enlarge the width of the flattened parison 116 from this state, procedures as the reverse as the above are conducted.

The above procedure achieves the width change of the hollow flattened parison 116 extruded from the clearance between the flattened die 113 and the flattened core 112.

In this embodiment, since the core 112 includes the replaceable portion 112b at the center and the non-replaceable portions 112a at the ends and only the replaceable portion 112b is replaced, preparing a plurality of inexpensive-to-machine and straight (planar) replaceable portions 12b having different lengths is enough. This reduces the cost.

If the actuator 111 is advanced/retracted upon signals from a gap setting device (not shown) during the injection of flattened parison 116 to move the flattened core 112 up and down appropriately via the mandrel 109, the clearance (gap) between the core 112 and the die 113 varies so that it is possible to adjust the thickness profile of the flattened parison 116 in the injection direction (longitudinal direction). Similarly, if the actuator 119 is advanced/retracted upon other signals from the gap setting device during the injection of the flatted parison 116 to move the slide piece 118 right and left appropriately, it is possible to adjust the thickness profile of the flattened parison 116 in the width direction.

(2) Now, an embodiment of a second invention will be described with reference to FIGS. 7–11.

Figure 7:
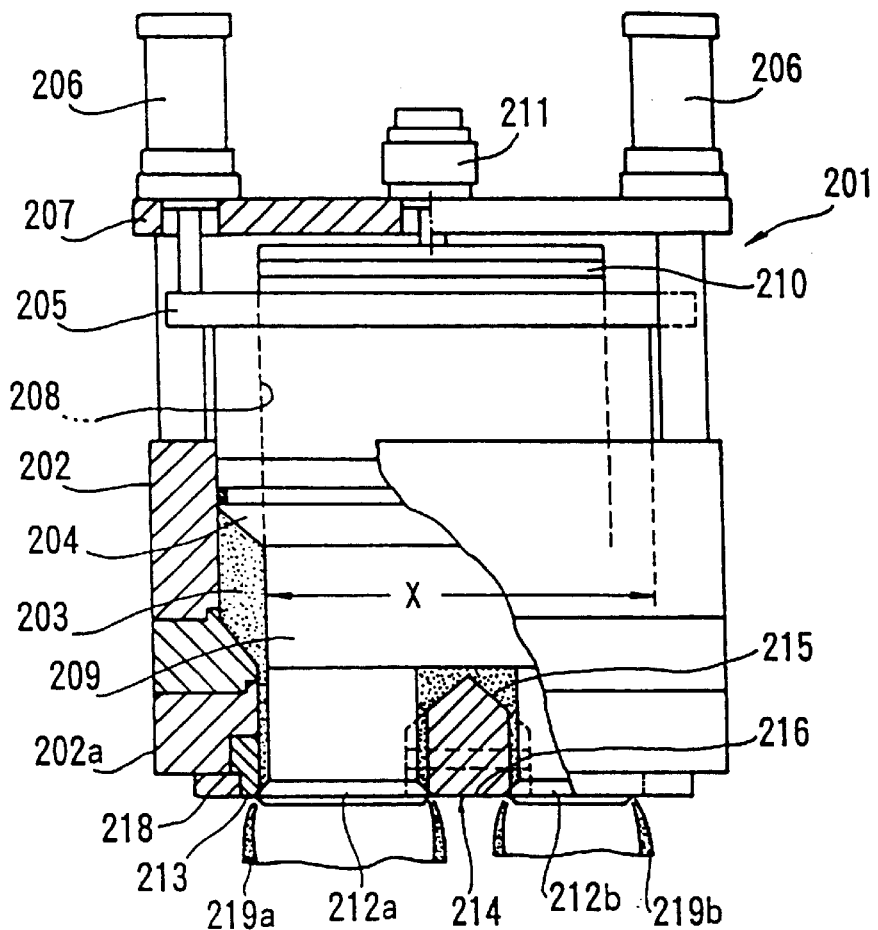
FIG. 7 is a front view of a flat blow molding machine showing one embodiment of a second invention.
Figure 9:
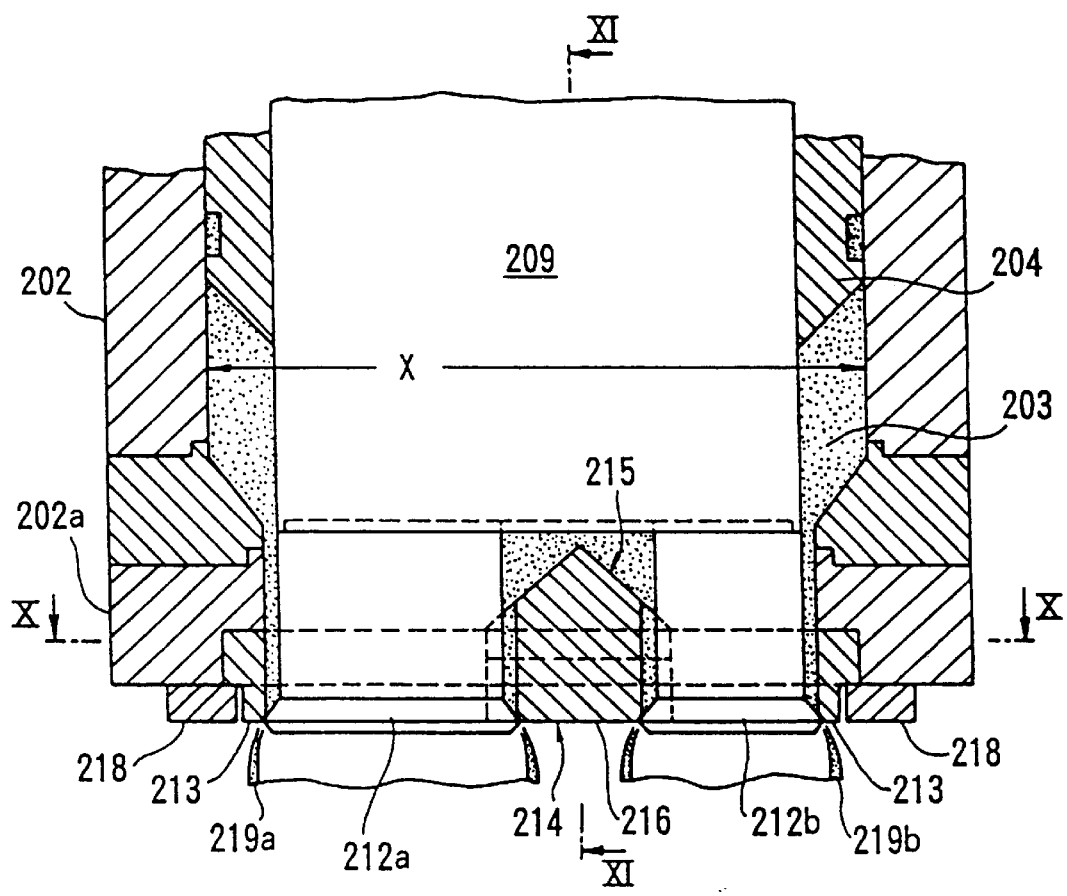
FIG. 9 is an enlarged view of major part shown in FIG. 7.
Figure 10:
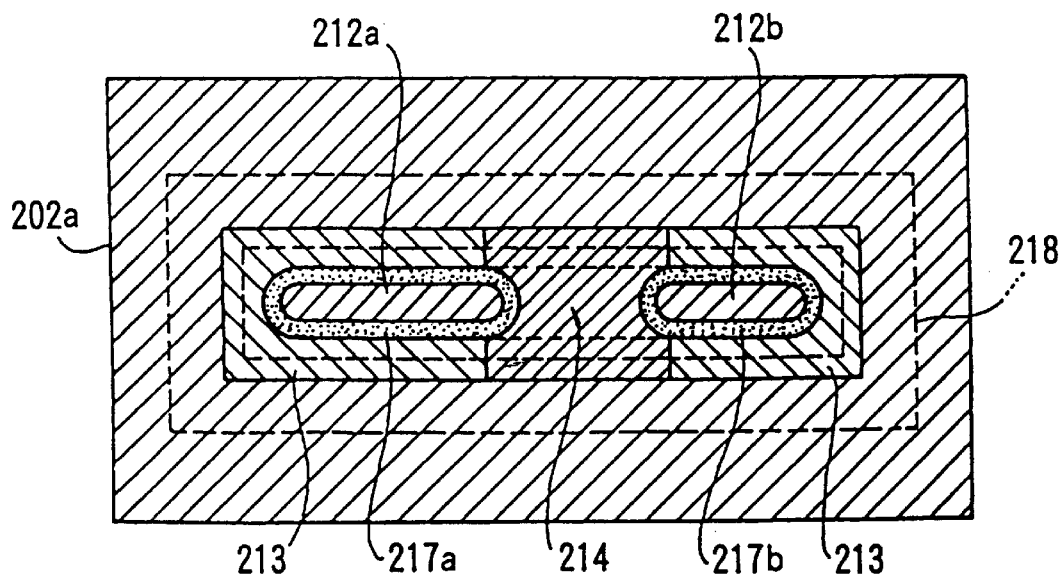
FIG. 10 is a sectional view taken along the line X—X of FIG. 9.
Figure 11:
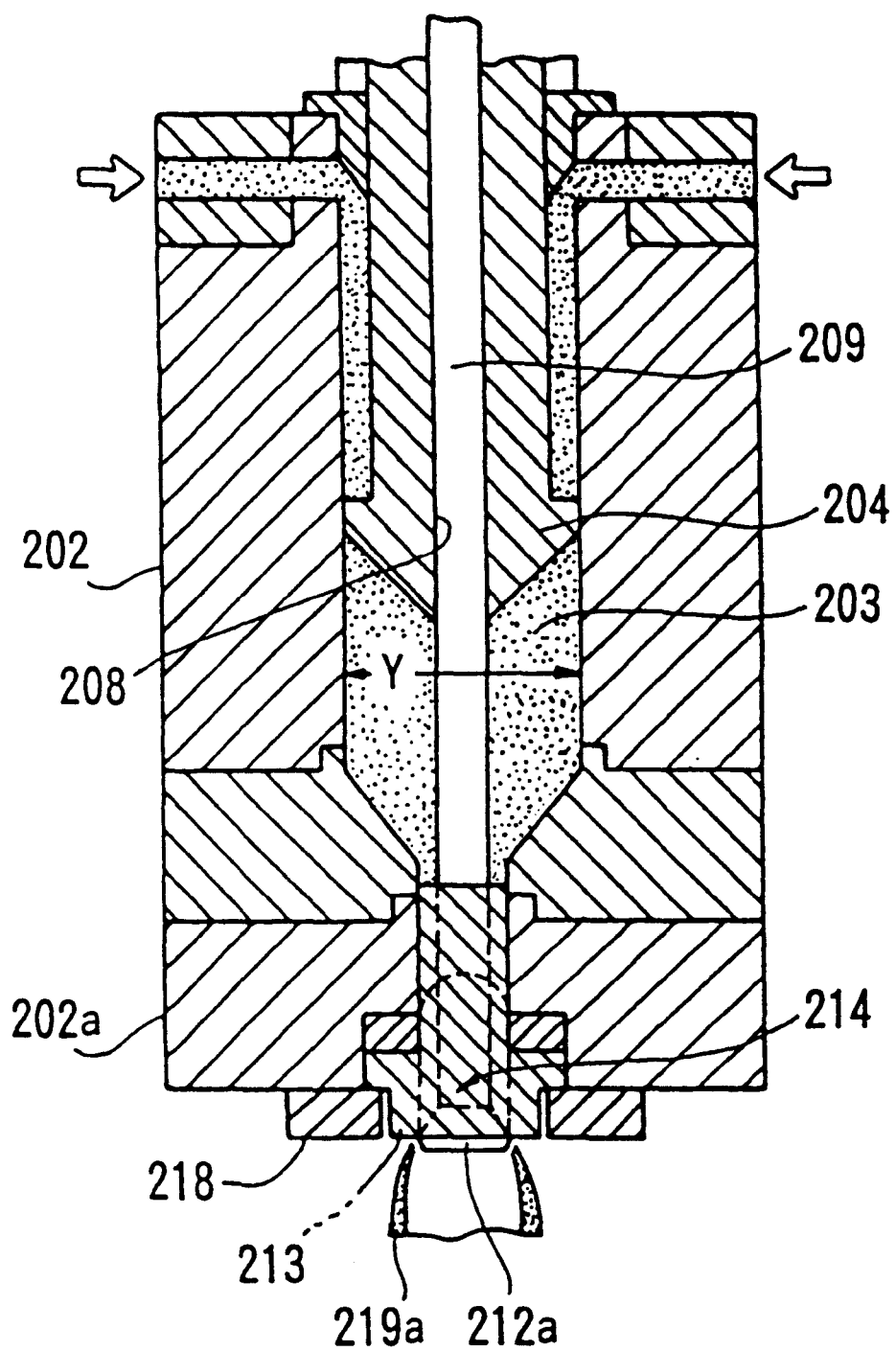
FIG. 11 is a sectional view taken along the line XI—XI of FIG. 9.

FIG. 7 illustrates a front view of the flat blow molding machine 201, FIG. 9 illustrates an enlarged view of major part thereof, FIG. 10 shows a sectional view as taken along the line X—X of FIG. 9 and FIG. 11 shows a sectional view as taken along the line XI—XI of FIG. 9.

As illustrated, an accumulator chamber 203 having a width X and a thickness Y vertically extends in a housing 202. Inside the accumulator chamber 203, housed is a flattened piston 204 which is slidable vertically. The flattened piston 204 is connected with a hydraulic cylinder 206 located above the housing 202 via an intermediate member 205. The hydraulic cylinder 206 is mounted on a frame 207 located on a top of the housing 202. According to this construction, if the hydraulic cylinder 206 is expanded/contracted, the piston 204 slides vertically in the accumulator chamber 203 so that the resin filled therein is compressed.

The flattened piston 204 has a flattened opening 208 in a vertical direction and a planar mandrel 209 extends through the opening 208. The upper end of the mandrel 209 is connected with an actuator 211 (cylinder mechanism) located on the frame 207 via an intermediate member 210, and a flattened core 212 is mounted on a lower end of the mandrel 209 by a bolt (not shown). The flattened core 212 includes a first flattened core 212a and a second flattened core 212b having a width smaller than the flattened mandrel 209. These cores are spaced at a prescribed distance.

Each flattened core 212a or 212b has an enlarged tip, and a flattened die 213 is installed around the core at prescribed clearance. Further, an intermediate piece 214 is interposed between the first and second flattened cores 212a and 212b to divide them. The intermediate piece 214 has a top 215 shaped like a mountain, as shown in FIG. 9, to guide the resin in the accumulator chamber 203 to the flattened cores 212a and 212b respectively and has a bottom 216 shaped to be continuous to the flattened die 213, as shown in FIG. 10, to form two parison injection openings 217a and 217b. The flattened die 213 and the intermediate piece 214 are mounted on a lower housing 202a by a plate 218. The lower housing 202a is mounted on a lower end of the main housing 202.

According to this construction, if the piston 204 descends to compress the resin in the accumulator chamber 203, the compressed resin is extruded from the clearance between the flattened die 213 and the first and second flattened cores 212a and 212b (i.e., the two parison injection openings 217a and 217b) in the form of hollow flattened parison 219a and 219b having predetermined widths, respectively. During this operation, if the actuator 211 which moves the mandrel 209 up and down is manipulated to move the cores 212a and 212b so as to adjust the clearance between the die 213 and the cores, it is possible to control the thickness (wall thickness) of the extruded flattened parison 219a and 219b in the extruding direction.

Next, operations of this embodiment having the above-described construction will be explained.

Figure 8:
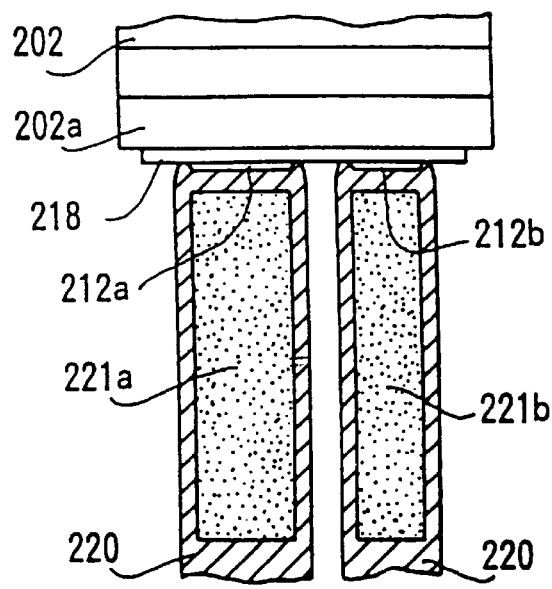
FIG. 8 shows a product made by air blowing into flattened parison as injected from the molding machine shown in FIG. 7.

As illustrated in FIG. 9, the hollow flatted parison 219 extruded from the gap between the flattened die 213 and the core 212 is divided by the intermediate piece 214 so that two flattened parison 219a and 219b are simultaneously injected from a single molding machine 201. In this situation, the parison is not extruded beneath the intermediate piece 214. Thus, if these flattened parison 219a and 219b is sandwiched by a flat metallic mold (not shown) in a direction perpendicular to the drawing sheet and air is blown, unnecessary flashes 220 (as indicated by oblique lines) are minimized as shown in FIG. 8.

Figure 35:
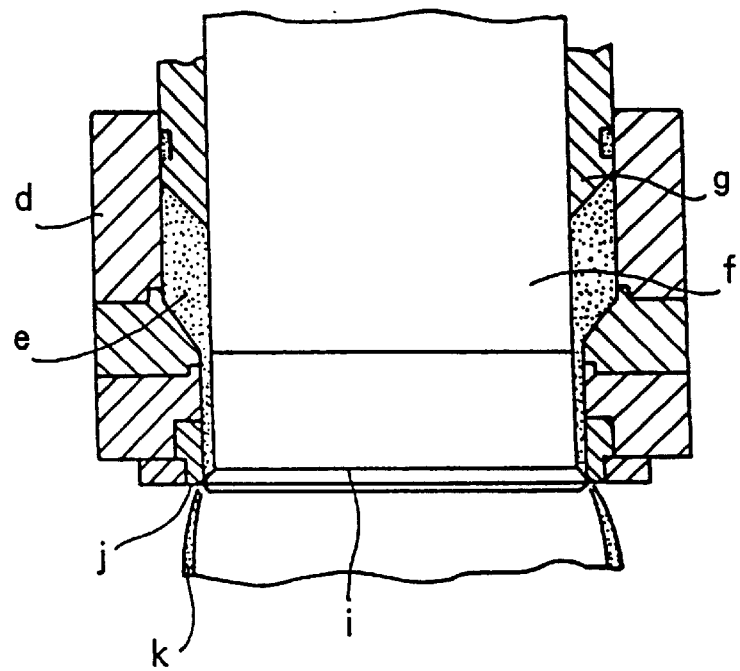
FIG. 35 is a partially enlarged view of FIG. 34(a)
Figure 36:
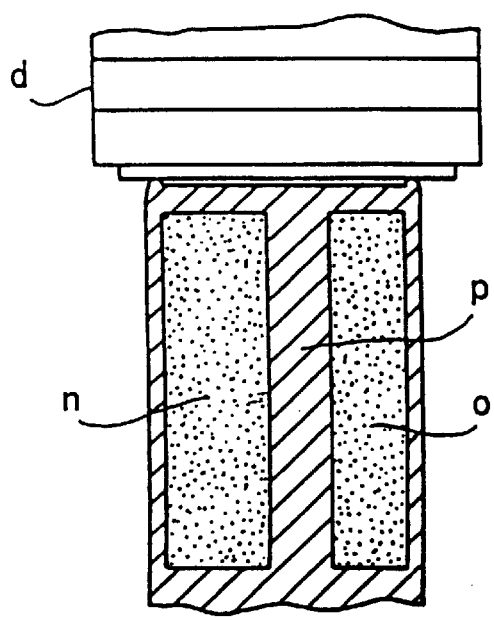
FIG. 36 shows a product made by air blowing into flattened parison as injected from the flat blow molding machine.

In other words, when two products 221a and 221b having relatively small widths are manufactured, conventionally the flattened parison "k" is extruded, as shown in FIGS. 35 and 36, and the parison is crushed by a projection of the metallic mold to obtain a molded product having flashes p. In this embodiment, on the other hand, flattened parison 219a and 210b which has conformance with the products 221a and 221b having reduced widths is injected, sandwiched by the metallic mold and air is blown therein. Thus, it is possible to minimize unnecessary flashes 220. As a result, expenses on material and manufacturing are reduced. This promotes resource saving and energy saving.

By changing the width and the number of the intermediate pieces 214 in accordance with the width of the products 221a and 221b to appropriately adjust the width of the extruded flat parison 219a and 219b, a single molding machine 201 can cope with various kinds and widths of products and the productivity is improved.

(3) Next, an embodiment according to a third invention will be explained with reference to FIGS. 12–16.

Figure 12:
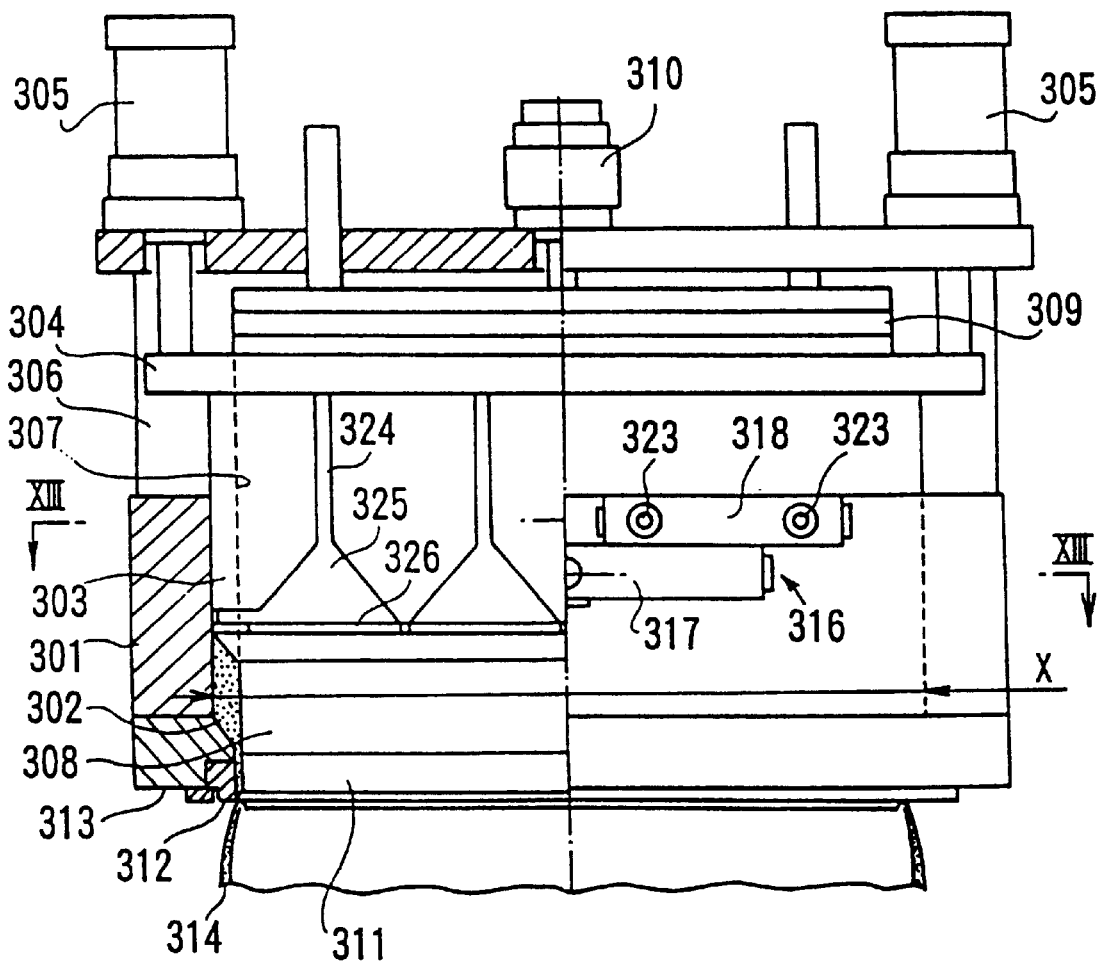
FIG. 12 is a front view of a flat blow molding machine showing an embodiment of a third invention.
Figure 13:
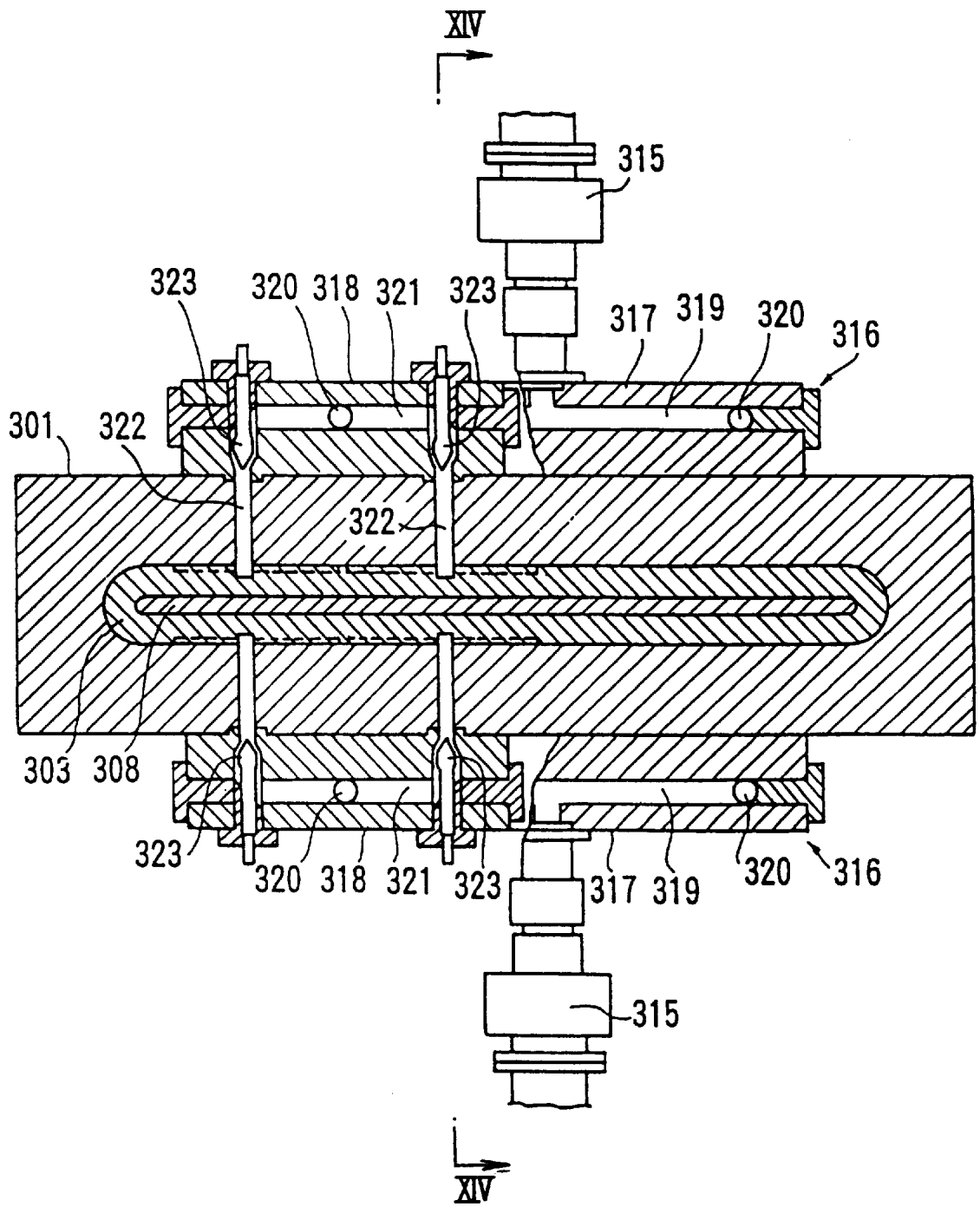
FIG. 13 is a sectional view taken along the line XIII—XIII of FIG. 12.
Figure 14:
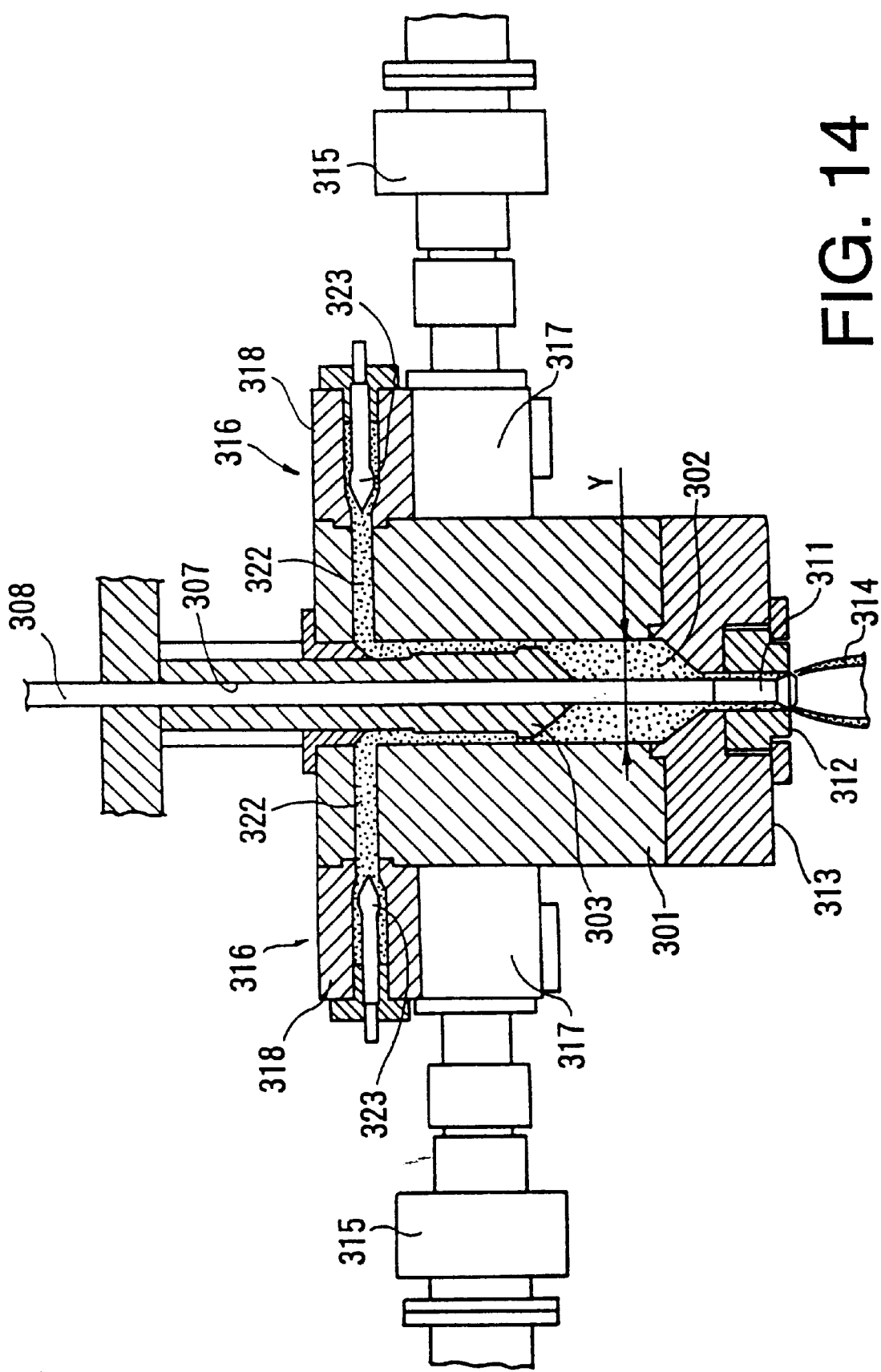
FIG. 14 is a sectional view taken along the line XIV-XIV of FIG. 13.

FIG. 12 shows a front view of a flat molding machine, FIG. 13 shows a sectional view taken along the line XIII—XIII of FIG. 12 and FIG. 14 shows a sectional view taken along the line XIV—XIV of FIG. 13.

As illustrated, an accumulator chamber 302 having a width X and a thickness Y is vertically formed in a housing 301. The accumulator chamber 302 has a flattened section. In the accumulator chamber 302, housed is a flattened piston 303 which can vertically slide. The flattened piston 303 is connected with a hydraulic cylinder 305 located above the housing 301 via an intermediate member 304. The hydraulic cylinder 305 is mounted on a frame 306 located at a top of the housing 301. According to this construction, if the hydraulic cylinder 305 is expanded/contracted, the piston 303 slides up and down in the accumulator chamber 302 to compress the resin filled therein.

The flattened piston 303 has a vertically extending flat opening 307 and a planar mandrel 308 is inserted in the opening 307. A top of the mandrel 308 is connected with an actuator 310 (cylinder mechanism) located on the frame 306 via an intermediate member 309. A flattened core 311 is mounted on a lower end of the mandrel 308 by a bolt (not shown). The flattened core 311 has a reduced tip, around which a flattened die 312 is provided to surround the core at prescribed clearance. The flattened die 312 is mounted on a lower housing 313 mounted on a lower end of the housing 301.

According to this construction, as the piston 303 descends to compress the resin in the accumulator chamber 302, the compressed resin is extruded from the clearance between the flattened die 312 and the flattened core 311 as hollow flattened parison 314. At this point, if the actuator 310 which descends/ascends the mandrel 308 is manipulated to move the core 311 up and down thereby adjusting the clearance (gap) between the die 312 and the core 311, it is possible to control the thickness (wall thickness) of the extruded flat parison 314 in the extruding direction.

As depicted in FIG. 14, extruders 315 are mounted on the housing 301 on left and right in the width Y direction via resin passage blocks 316 to feed the plasticized resin into the accumulator chamber 302. The resin passage block 316 includes a lower first passage block 317 and an upper second passage block 318. As illustrated in FIG. 13, a first passage 319 extending in the width X direction is formed in the first passage block 317 and the extruder 315 is connected at the center of the first passage. At ends of the first passage 319, formed are connecting paths 320 which are directed to the upper second passage block 318. A second passage 321 which extends in the width X direction is formed in the second passage block 318, and feed passages 322 formed in the housing 301 for feeding the resin to a lateral portion of the flattened piston 303 are connected to the second passage 321 at prescribed intervals in the width X direction.

A flow rate control valve 323 is located in each feed passage 322 to control a flow rate of the resin flowing therethrough. The flow rate valve 323 includes a blot member screwed into the second passage block 318. As a bolt head of the blot member is rotated from outside, the gap between a bolt tip (needle valve) and a valve seat is adjusted to control the flow rate of the resin.

Figure 15:
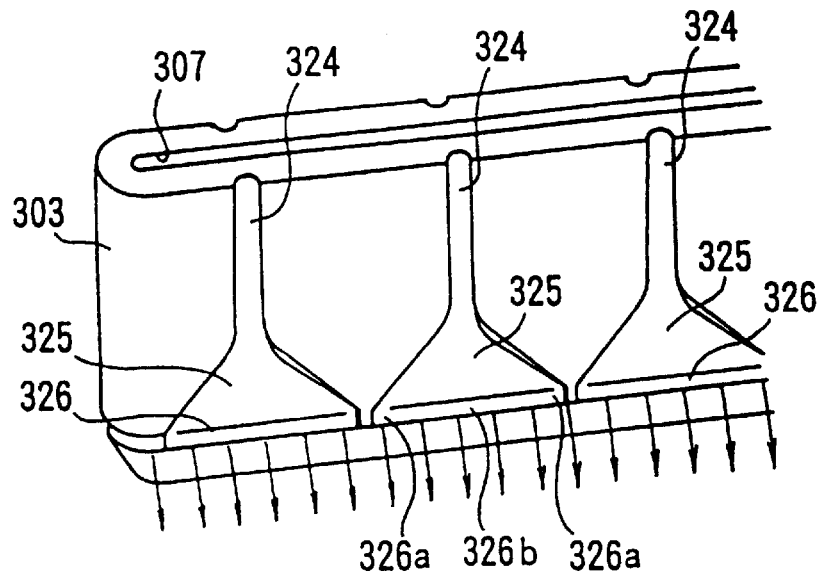
FIG. 15 is a perspective view of a flat piston of the flat flow molding machine shown in FIG. 12.
Figure 16:
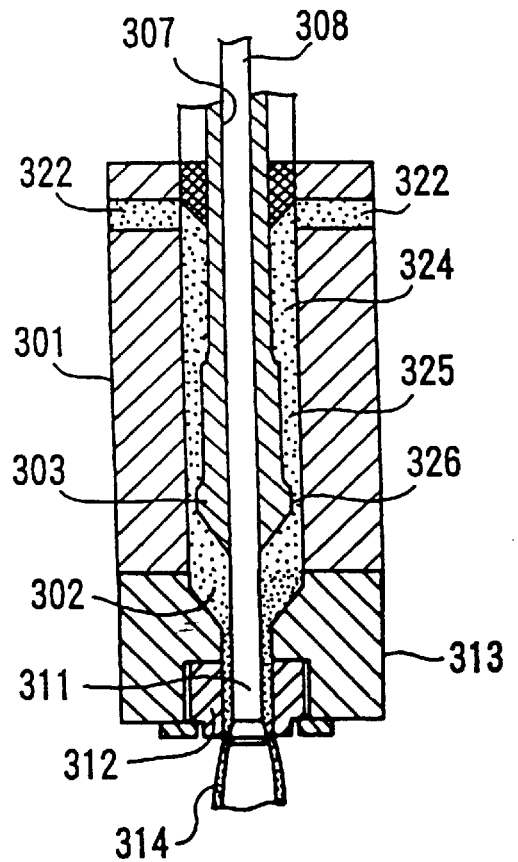
FIG. 16 is a lateral section of the flat blow molding machine shown in FIG. 12.

The resin introduced into the housing 301 through the feed passages 322 flows in resin feed grooves 324 vertically extending in a lateral face of the flattened piston 303 and a hanger-type resin distribution groove 325 connected with the resin feed grooves 324 and is directed to the accumulator chamber 302 located below, as shown in FIGS. 15 and 16. Specifically, the resin feed grooves 324 are vertically formed in the lateral face of the flat piston 303 at intervals in the width X direction such that they correspond to the feed passages 322 formed in the second passage block 318 and the housing 301 respectively, and the resin distribution grooves 325 are connected to the lower ends of the resin feed grooves 324 such that they extend like a hanger downward in the width X direction.

A distribution weir 326 is provided at a downstream end of the resin distribution groove 325 to temporarily stop the resin in the distribution groove 325. Specifically, the distribution weir 326 is taller than the resin distribution groove 325 by one step and co-operates with the inner face of the accumulator chamber 302 to form a weir against the flow of resin. The height of the distribution weir 326 is low at the ends 326a of the resin distribution groove 325 and high at the center 326b in the width X direction. In other words, the clearance at the center 326b of the distribution weir 326 is narrow to restrict the flow of resin whereas the clearance at the ends 326a is wide to insure smooth flow. This corrects the resin pressure which has a tendency of becoming low at the ends 326a of the distribution weir 326 located near the resin feed groove 324 as compared with at the center 326b. Thus, the flow rate of the resin becomes substantially uniform in the width X direction.

Now, operations of this embodiment having the above-described construction will be explained.

If the resin extruded from the extruders 315 located right and left in the thickness Y direction, it flows in the first passages 319 in the first passage block 317 and then in the second passages 321 in the second passage block 318 via the connecting paths 320. Then, the resin flows through the feed passages 322 and its flow rate is appropriately adjusted by the flow rate valves 323 such that the flow rate in the respective feed passages 322 become equal to each other. After that, the resin flows in the resin feed grooves 324 formed in the lateral face of the flattened piston 303.

Then, the resin introduced into the resin feed grooves 324 passes through the hanger-type resin distribution grooves 235 communicating with the lower ends of the resin feed grooves and flows over the distribution weirs 326 at the downstream end of the distribution grooves 325 to reach the accumulator chamber 302. Since the height of the distribution weir 326 is low at the ends in the width X direction and high at the center 326b, the flow rate of the resin is substantially uniform in the width X direction.

As a result, the resin pressure in each resin feed groove 324 is substantially uniform in the width X direction and the resin pressure downstream of the distribution weir 326 of the resin distribution groove 325 connected with each resin feed groove 324 is substantially uniform in the width X direction. Thus, the resin pressure in the accumulator chamber 302 becomes uniform in the width X direction. Accordingly, it is possible to inject flat parison 314 with no bending from the clearance between the flat die 312 and the flat core 311.

(4) Next, an embodiment of a fourth invention will be explained with reference to FIGS. 17–19.

Figure 18:
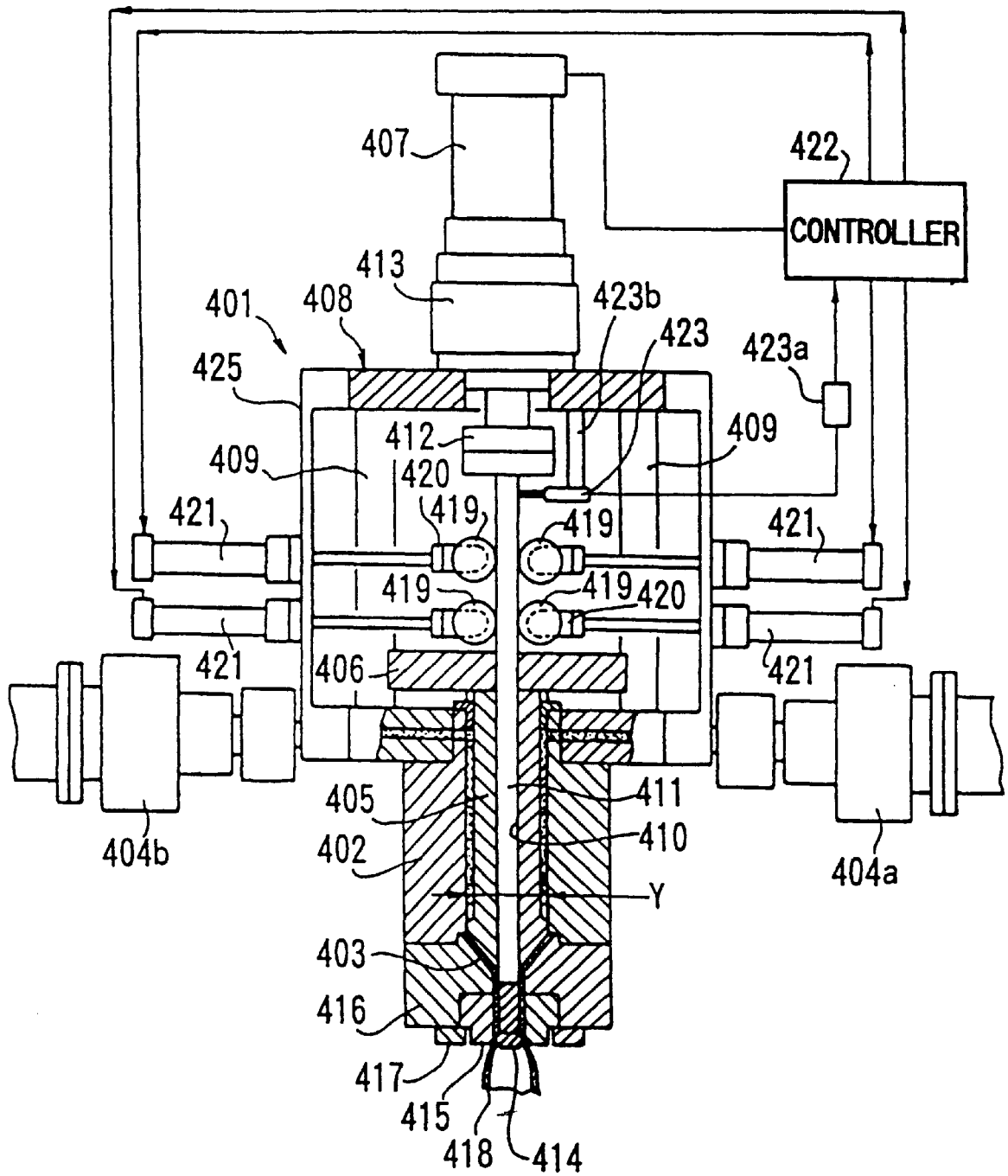
FIG. 18 is a lateral view of the flat blow molding machine shown in FIG. 17, part of which is illustrated in section, when the flat piston is in descending stroke.
Figure 19:
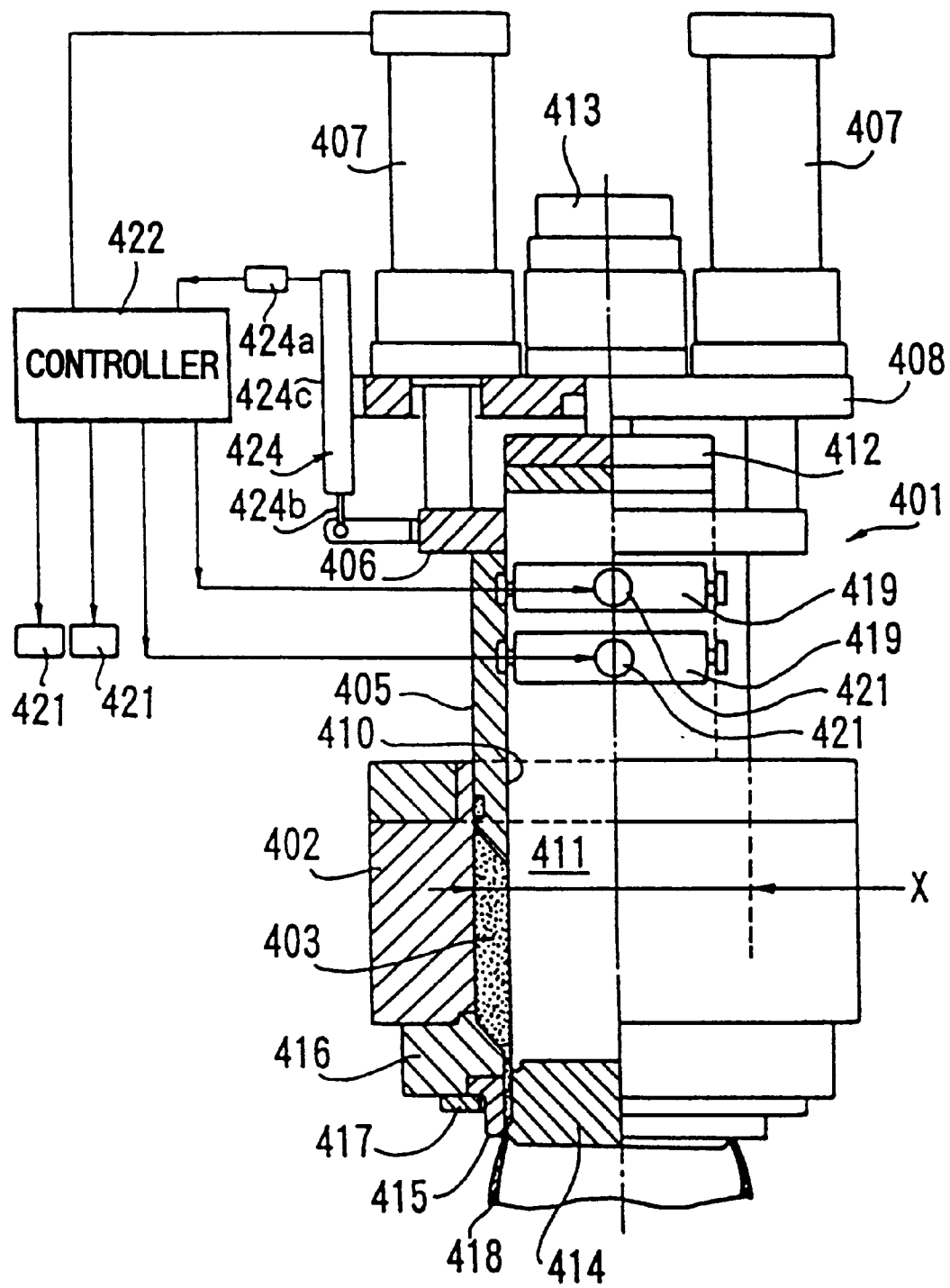
FIG. 19 is a front view of the flat blow molding machine shown in FIG. 17, part of which is illustrated in section.

FIG. 18 shows a lateral view of a flat blow molding machine 401 and FIG. 19 shows a front view of the same. As illustrated, an accumulator chamber 403 having a width X and a thickness Y is vertically defined in a housing 402. The accumulator chamber 403 has a flattened section. Plasticized resin is fed into the accumulator chamber 403 from two extruders 404a and 404b located right and left in the thickness Y direction. Here, only one of the extruders 404a and 404b may be installed and the resin may be distributed to the accumulator chamber 403 through a distribution valve (not shown).

A flattened piston 405 which is slidable vertically is housed in the accumulator chamber 403. The flattened piston 405 is connected to a hydraulic cylinder 407 located above the housing 402 via an intermediate member 406. The hydraulic cylinder 407 is mounted on a frame 408 mounted on a top of the housing 402. According to this construction, as the hydraulic cylinder 407 is expanded/contracted, the piston 405 moves up and down in the accumulator chamber 403 to press the resin filled therein. Incidentally, a numeral 409 in FIG. 18 designates a rod to fix the housing 402 with the frame 408.

A vertically elongated flattened opening 410 is formed in the flattened piston 405 and a planar mandrel 411 extends in the opening 410. A top of the mandrel 411 is connected with an actuator 413 (cylinder mechanisms) located above the frame 408 via an intermediate member 412. The flattened core 414 is mounted at a bottom of the mandrel 411 by a bolt. A tip of the flattened core 414 is enlarged and a flattened die 415 is installed around it to surround it at prescribed clearance. The die 415 is mounted on a lower housing 416 mounted at a lower end of the housing 402 by a plate 417.

According to this construction, as the piston 405 moves up and down to pressurize the resin in the accumulator chamber 403, the pressurized resin is extruded from the clearance between the flattened die 415 and the flattened core 414 as hollow flattened parison 418. If the actuator 413 which ascends and descends the mandrel 411 is manipulated to move the core 414 up and down so as to adjust the clearance (gap) between the core 414 and the die 415, the thickness (wall thickness) of the extruded flattened parison 418 is controlled in the direction of extrusion.

A feature of this embodiment lies in a point that there are provided presser rolls 419 on the frame 408 above the accumulator chamber 403 on right and left of the flattened mandrel 411 for sandwiching the flattened mandrel 411 from right and left, as shown in FIG. 18. These presser plates 419 are rotatably supported by brackets 420 and these brackets 420 are mounted on actuators 421 (hydraulic cylinder and stepping motor, etc.) fixed on frames 425 installed right and left of the housing 402 and the frame 408. Specifically, as the actuator 421 expands and contracts, each presser roll 419 contacts and leaves a right or left face of the flattened mandrel 411. These actuators 421 are connected with respective controllers 422 and independently controlled to be expanded and contracted upon commands from the controllers 422.

A first sensor 423 for detecting an amount of movement of the flattened mandrel 411 and a second sensor 424 for detecting an amount of the flattened piston 405 are connected to the controllers 422 via computing elements 423a and 424a, respectively. The first sensor 423 is provided via a downwardly directed support 423b mounted on a top of the frame 408, as shown in FIG. 18. A tip of the first sensor 423 contacts a surface of the flattened mandrel 411 to detect the movement of the flattened mandrel 411. A mechanism such as a magnet scale is used to detect the movement of the mandrel 411. On the other hand, the second sensor 424 includes a rod 424b mounted on the intermediate member 406 above the flattened piston 405 and a cylinder 424c mounted on a top of the frame 408 to receive the rod 424b, as shown in FIG. 19. An amount of movement of the flattened piston 405 is detected by an amount of insertion of the rod 424b into the cylinder 424c. The controller 422 is also connected with the hydraulic cylinder 407 to move the flattened piston 405 up and down.

Figure 17:
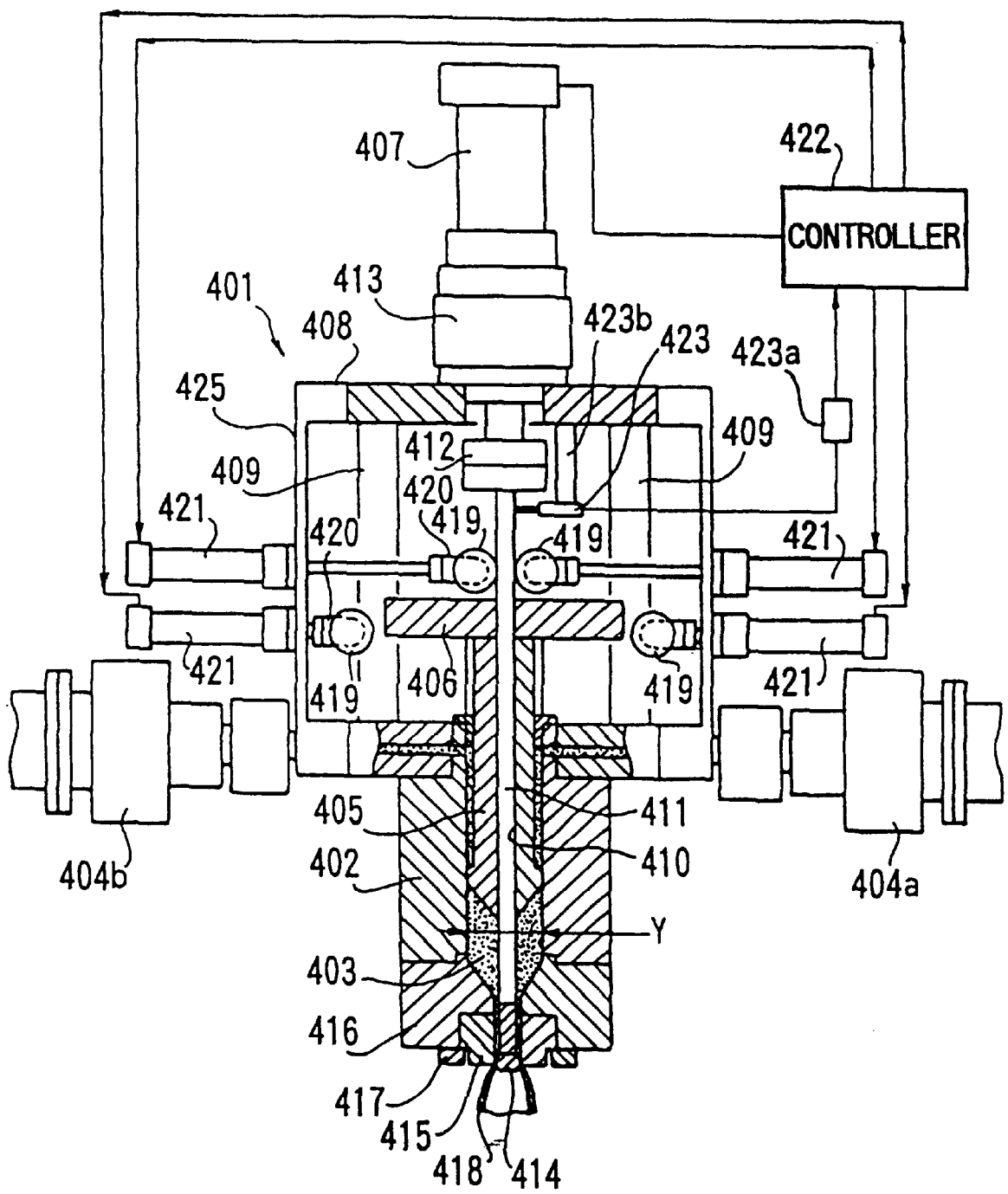
FIG. 17 is a lateral view of a flat blow molding machine according to one embodiment of a fourth invention, part of which is shown in section, when a flat piston is in ascending stroke.

Inside the controller 422, written is a program for calculating the position of the flattened piston 405 based on detection values obtained from the first and second sensors 423 and 424 and for appropriately contracting the actuator 421 to prevent contact between the flattened piston 405 and the presser roll 419 so as to separate the presser roll 419 from the flattened mandrel 411 when the flattened piston 405 is lifted as shown in FIG. 17.

Now, operations of this embodiment having the above-described construction will be explained.

As illustrated in FIG. 18, when the flattened piston 405 descends, the controller 422 causes each actuator 421 to expand so that the presser rolls 419 sandwich the flattened mandrel 411 above the piston 405 from right and left at two positions spaced in the height direction. Accordingly, the position of the flattened mandrel 411 during the parison injection is maintained at the center of the accumulator chamber so that the bending and offsetting of the flattened mandrel 411 are reduced.

Therefore, the clearance (gap) between the flattened core 414 located at the tip of the mandrel 411 and the flattened die 415 located at the bottom of the lower housing 416 is maintained at a constant or prescribed value during injection of the parison 418. As a result, the wall thickness of the injected flattened parison 418 becomes uniform so that the wall thickness change and bending of the parison are prevented. Thus, sound blow molding is realized.

Further, since the position of the flattened mandrel 411 is maintained at the center of the accumulator chamber 403, non-uniform slide is reduced between the flattened mandrel 411 and the flattened piston 405 and between the flattened piston 405 and the accumulator chamber 403. This prevents abnormal abrasion and galling on the slide face.

In addition, as shown in FIG. 17, when the flat piston 405 is lifted, the controller 422 causes each actuator 421 to appropriately contract from the bottom so that the flat mandrel 411 is separated from the presser roll 419. Accordingly, the presser roll 419 does not intervene the ascending flat piston 405 so that contact/interference with the presser roll 419 is prevented. FIG. 17 illustrates the flat piston 405 in ascending movement. If the flat piston further ascends, the upper presser roll 419 is also separated from the flat mandrel 411.

It should be noted that the presser rolls 419 should be provided in pairs at right and left, but they do not have to be provided in a plurality of pairs in the height direction; only one pair is satisfactory.

(5) Next, an embodiment of a fifth invention will be described with reference to FIGS. 20–22.

Figure 20:
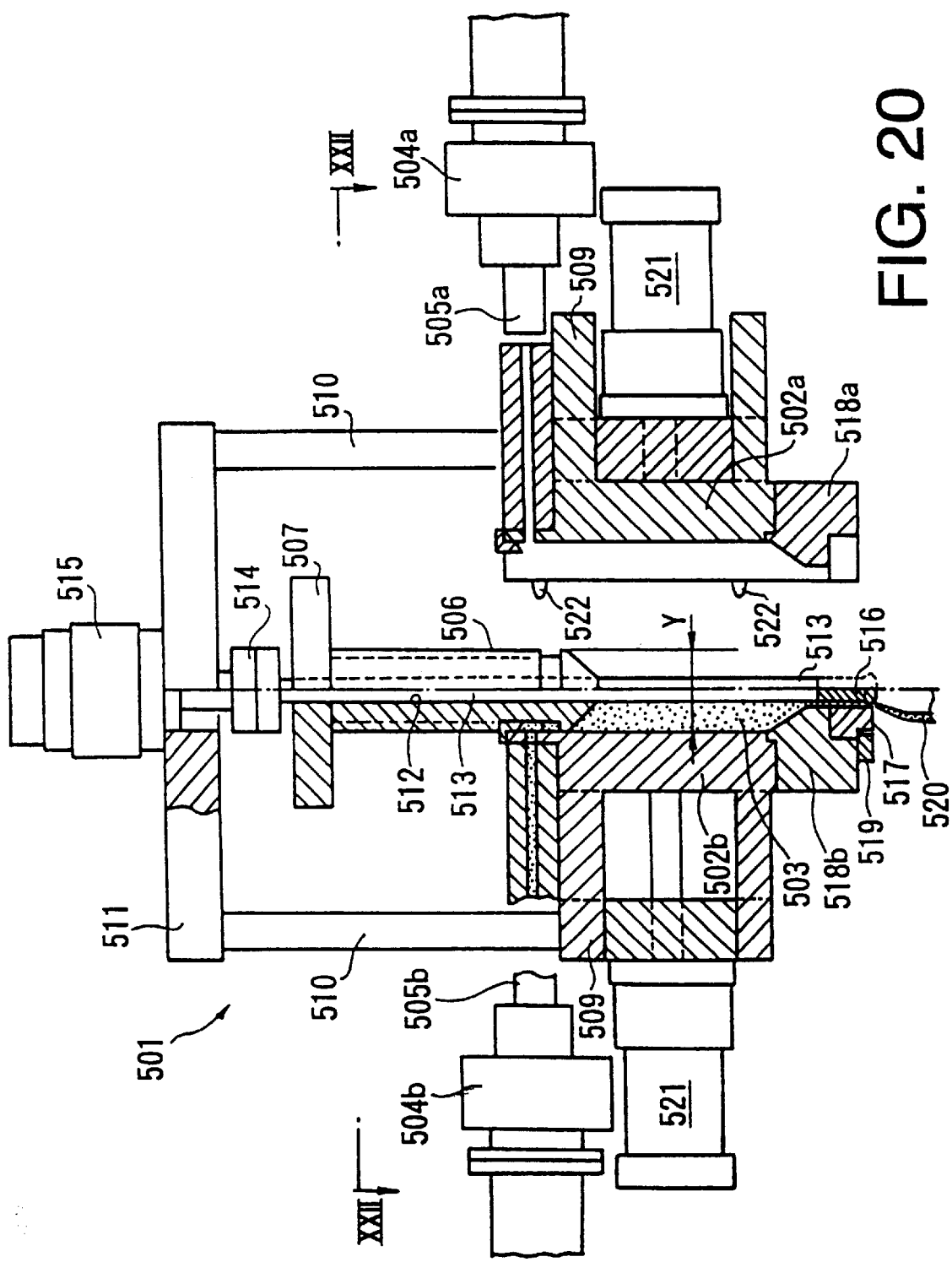
FIG. 20 is a lateral view of a flat blow molding machine according to one embodiment of a fifth invention, part of which is illustrated in section.
Figure 21:
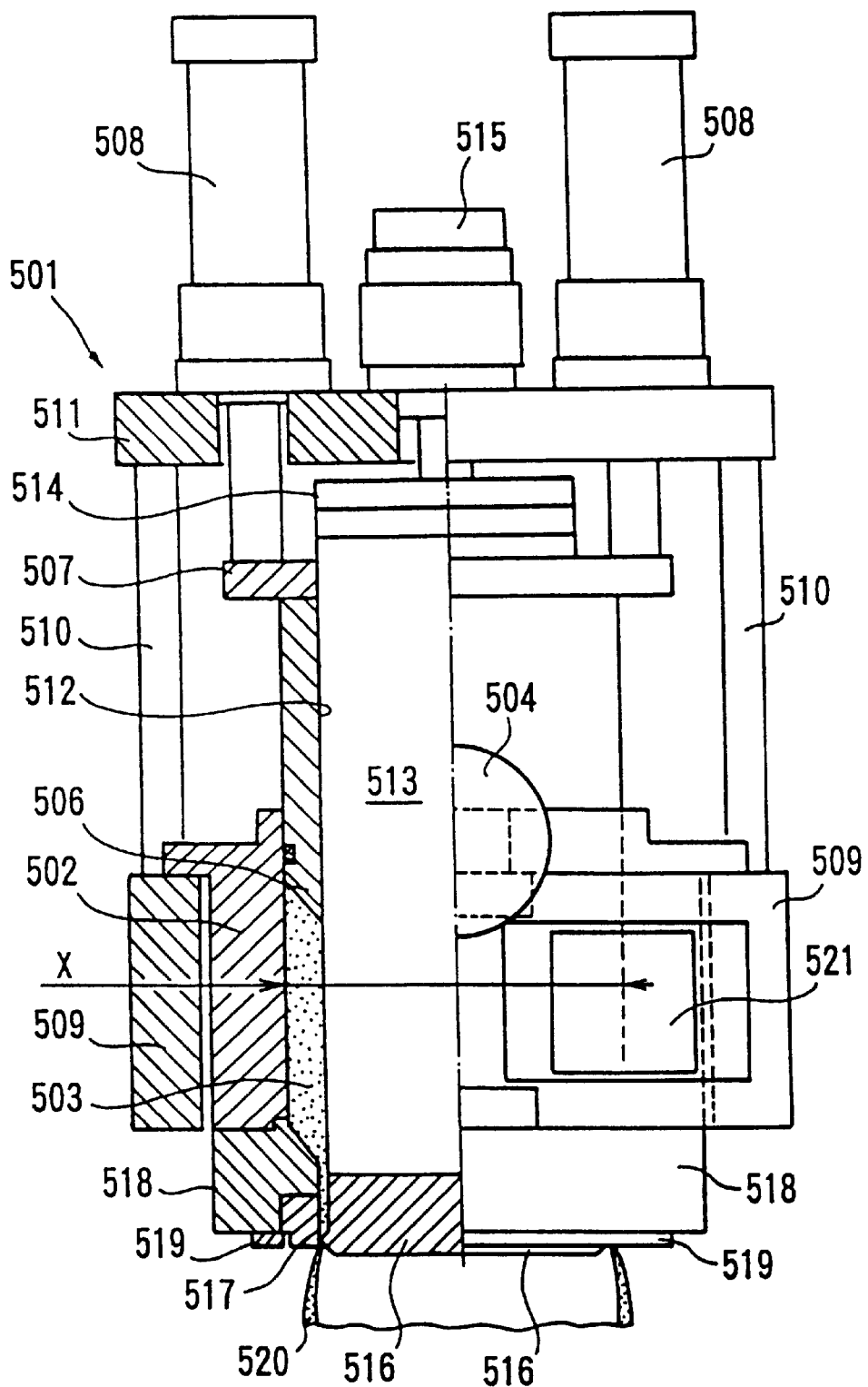
FIG. 21 is a front view of the flat blow molding machine shown in FIG. 20, part of which is depicted in section as taken along the line XXI—XXI of FIG. 22.
Figure 22:
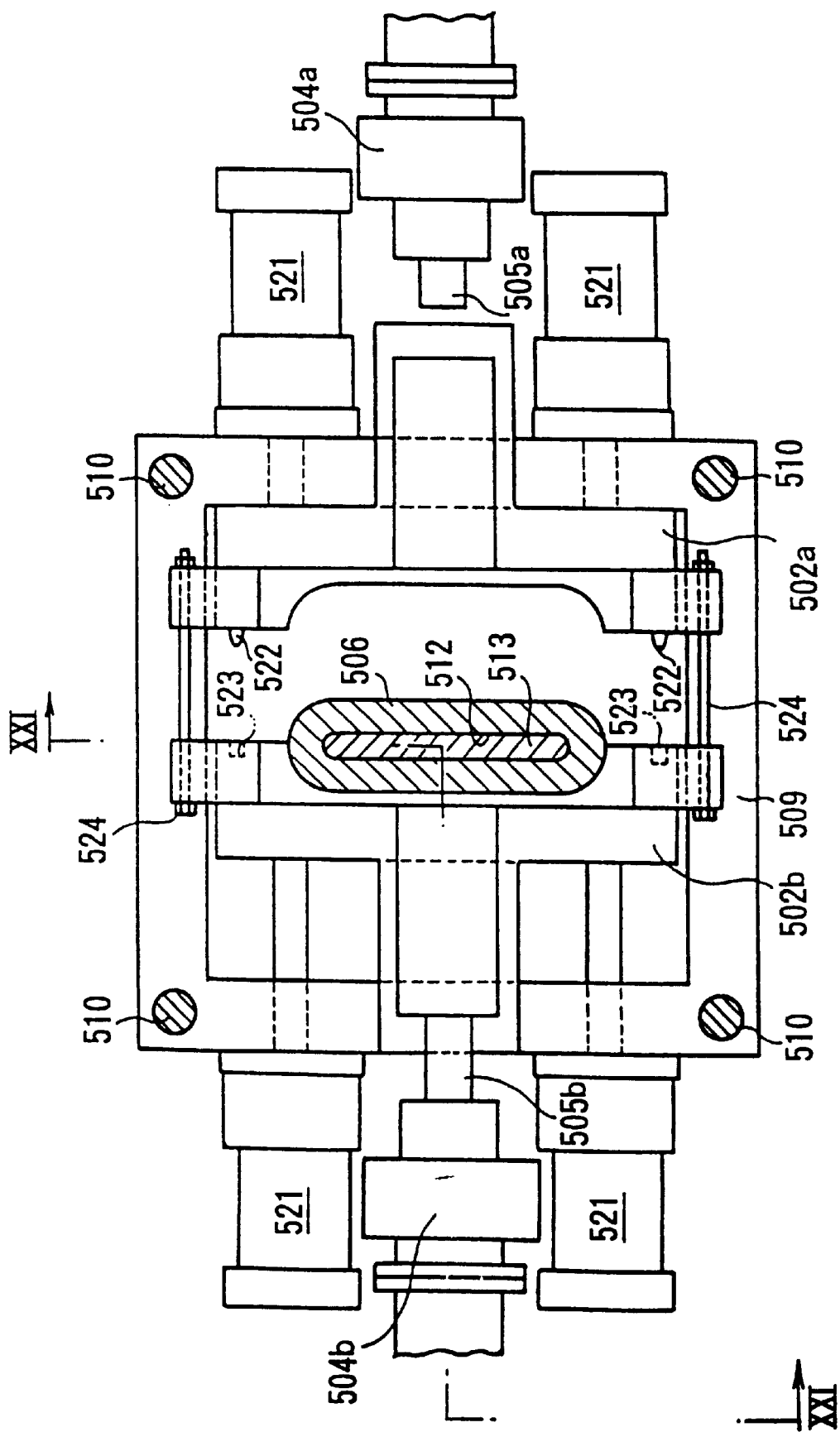
FIG. 22 is a sectional view taken along the line XXII—XXII of FIG. 20.

FIG. 20 shows a lateral view of a flat blow molding machine 501, FIG. 21 shows a front view of the same and FIG. 22 shows a sectional view taken as the line XXII—XXII of FIG. 20. As illustrated, a flat accumulator chamber 503 having a width Y and a thickness Y is formed in a housing 502. The housing 502 is made by combining a right housing piece 502a and a left housing piece 502b. Plasticized parison is fed into the accumulator chamber 503 from two extruders 504a and 504b via resin tubes 505a and 505b. The extruders 504a and 504b are located right and left in the thickness Y direction. The resin tubes 505a and 505b are slidably provided between the extruders 504a, 504b and the housing pieces 502a, 502b, respectively. It should be noted that only one of the extruders 504a and 504b may be provided and a distribution valve (not shown) may be provided to distribute the resin to the accumulator chamber 503.

A flattened piston 506 which can vertically slide is housed in the accumulator chamber 503. The flattened piston 506 is connected to a hydraulic cylinder 508 mounted above the housing 502 via an intermediate member 507. The hydraulic cylinder 508 is mounted on a plate member 511 mounted on a square frame 509 via four rods 510. The housing 502 is supported by the frame 509. According to this construction, as the hydraulic cylinder 508 expands and contracts, the piston 506 slides up and down in the accumulator chamber 503 to compress the resin filled therein.

A flattened opening 512 is vertically formed in the piston 506 and a planar mandrel 513 is inserted in the opening 512. An upper end of the mandrel 513 is connected with an actuator 515 (cylinder mechanism) mounted on the plate member 511 via an intermediate member 514. A core 516 is mounted on a lower end of the mandrel 513 by a bolt. A flattened die 517 is provided around the flattened core 516 at prescribed clearance to surround the core. The die 517 is mounted on a lower housing 518 mounted on a lower end of the housing 502 by a plate 519. The lower housing 518 is divided into a lower right housing piece 518a and a lower left housing piece 518b and they are mounted on a lower end of the right housing piece 502a and a lower end of the left housing piece 502b, respectively.

According to this construction, as the piston 506 compresses the resin in the accumulator chamber 503, the compressed resin is extruded from the clearance between the flattened die 517 and the flattened core 516 as the flattened parison 520. If the actuator 515 which moves the mandrel 513 up and down is manipulated to move the core 516 up and down so as to adjust the clearance (gap) between the core 516 and the die 517, it is possible to control the thickness (wall thickness) of the extruded flattened parison 520 in the direction of extrusion.

Next, a subject matter of this embodiment, i.e., "dividing the housing 502 which defines the accumulator chamber 503 into the right housing piece 502a and the left housing piece 502b" will be explained with reference to FIGS. 20 and 22.

As illustrated in FIG. 22, the housing pieces 502a and 502b are located in the square frame 509 and are movable in the frame, respectively. Specifically, two actuators 521 (two sets of a hydraulic cylinder, a motor, etc.) which slide the right and left housing pieces 502a and 502b are mounted on the frame 509 on right and left sides respectively, and the actuators 521 are caused to extend and retract to separate and combine the housing pieces 502a and 502b. When the actuators 521 are retracted to separate the housing pieces 502a and 502b from each other, the resin tubes 505a and 505b between the extruders 504a and 504b and the housing pieces 502a and 502b are removed to ensure the stroking of the slide movement.

The lower right housing piece 518a and the lower left housing piece 518b are mounted on the bottom of the right housing piece 502a and the bottom of the left housing piece 502b respectively, and they are integrally slid right and left upon extension/retraction of the actuators 521. Further, pins 522 and pin holes 523 are formed in contact faces of the right housing piece 502a and the left housing piece 502b for the positioning of combined housing pieces. The pin 522 is a tapered pin having a reduced tip for easier positioning. Pairs of bolt and nut 524 are provided at ends of the housing pieces 502a and 502b in the width direction respectively for screw-fixing the housing pieces so as to prevent separation of the housing pieces when combined. Therefore, if the right and left housing pieces 502a and 502b are joined with each other and the bolt/nut sets 524 are screwed, there is no need to exert load on the actuators 521.

Next, operations of this embodiment having the above-described construction will be explained.

According to the apparatus 501, the flattened parison 520 is extruded from the clearance between the flattened die 517 and the flattened core 516, as shown in FIGS. 20 and 21.

If the color and/or material of the parison should be changed, i.e., if the color/material of the resin extruded from the extruders 504a and 504b into the accumulator chamber 503 should be changed, first the resin tubes 505a and 505b mounted between the extruders 504a and 504b and the housing pieces 502a and 502b are removed to ensure the stroking of sliding movement of the housing pieces 502a and 502b. Then, the bolts and nuts 524 combining/fixing the housing pieces 502a and 502b are removed and the actuators 521 are extended/retracted to slide the right and left housing pieces 502a and 502b thereby separating the housing pieces. After that, the flattened die 517b mounted on the lower housing 518 and the flattened core 516 mounted on the lower end of the mandrel 513 are removed, respectively.

As a result, the right and left housing pieces 502a and 502b move to the left and right ends, respectively, so that only the flattened piston 506 and the flattened mandrel 513 are left at the center. In other words, the inner wall of the accumulator chamber 503 defined by the inner walls of the housing pieces 502a, 502b, 518a and 518b are subjected to the air. Thus, it is possible to easily remove the resin adhering on the interior by hands or robots. In other words, the inside cleaning is very easy to conduct.

If the separated right and left housing pieces 502a and 502b should be combined, the procedure opposite the above will be performed. This embodiment deals with a case where the present invention is applied to a flat blow molding machine for injecting hollow flat parison to obtain a flat product. However, it is of course that the present invention is not limited to this example, but may be applied to an ordinary blow molding machine which injects the parison in cylindrical form. In such a case, the accumulator chamber 503 will be cylindrical, the piston 506 will be cylindrical, the die 517 will be circular and the core 516b will be circular.

(6) Next, an embodiment of a sixth invention will be explained with reference to FIGS. 23–28.

Figure 23:
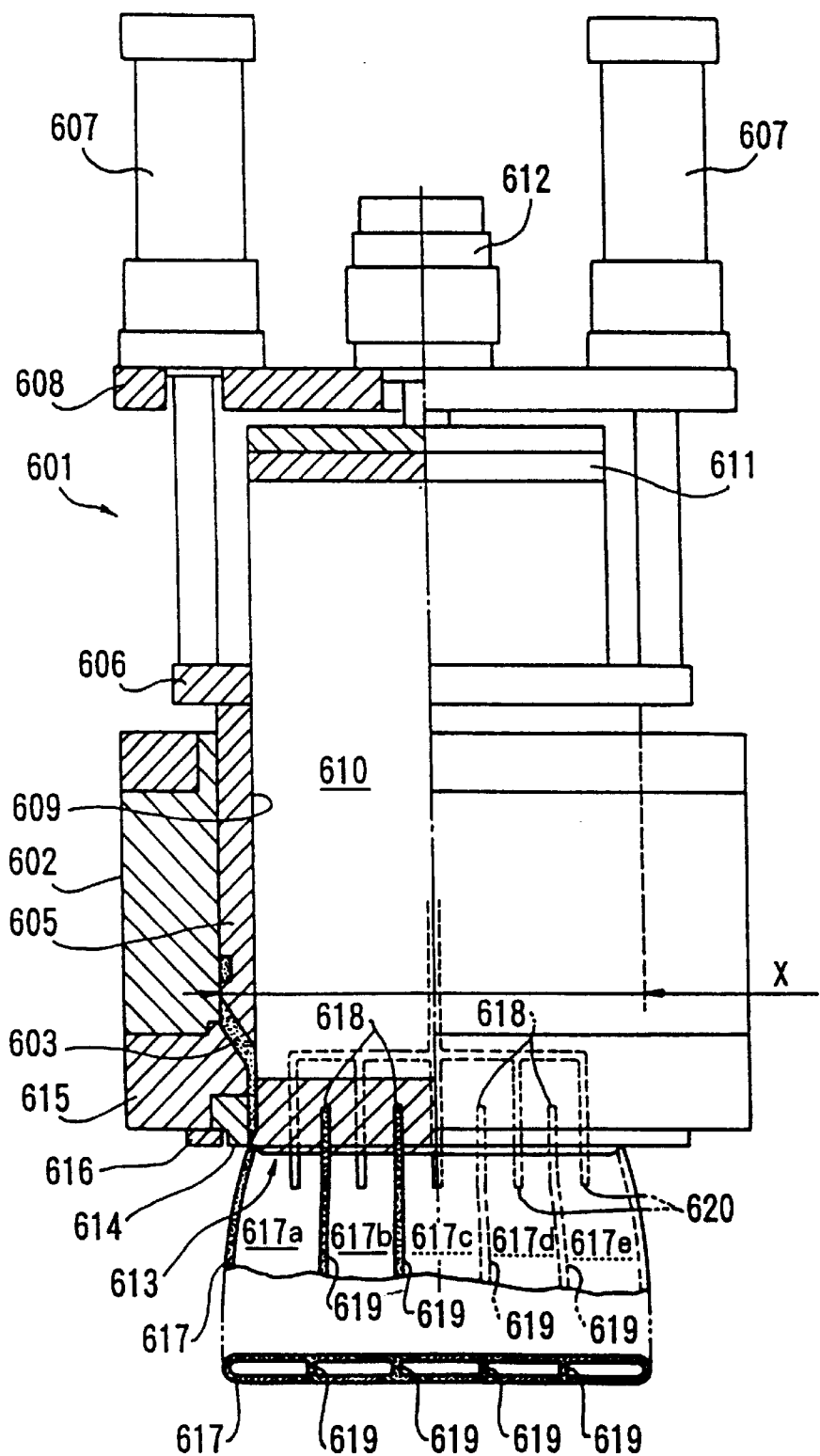
FIG. 23 is a front view of a flat blow molding machine according to one embodiment of a sixth invention, part of which is depicted in section.
Figure 24:
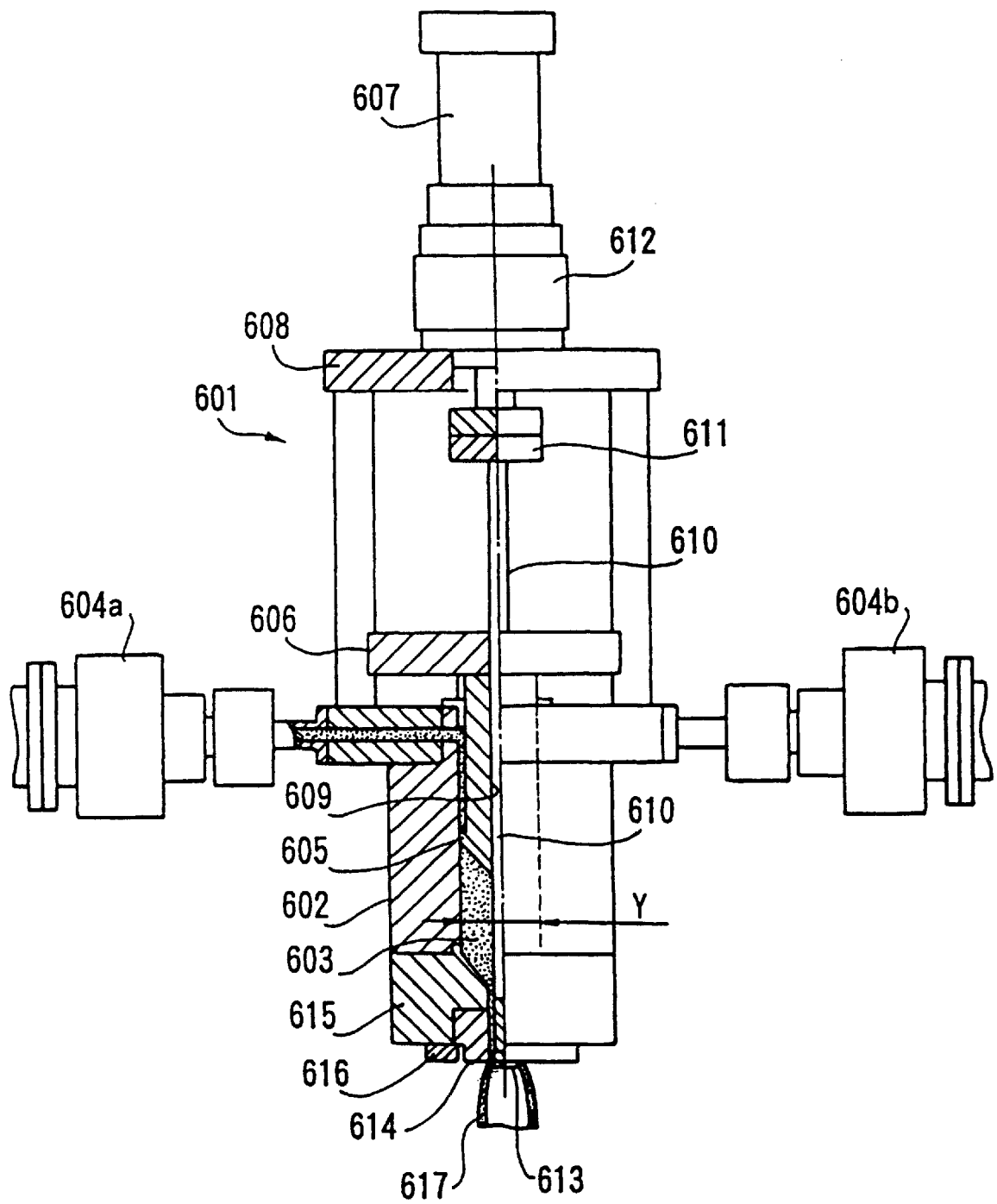
FIG. 24 is a partially sectioned lateral view of the flat blow molding machine shown in FIG. 23.

FIG. 23 shows a front view of a flat blow molding machine and FIG. 24 shows a lateral view of the same. As illustrated, a flattened accumulator chamber 603 having a width X and a thickness Y is vertically formed in a housing 602. Plasticized resin is fed into the accumulator chamber 603 from two extruders 604a and 604b located right and left in the thickness Y direction. Here, only one of the extruders 604a and 604b may be provided and a distribution valve (not shown) may be provided to distribute the resin into the accumulator chamber 603.

A flattened piston 605 which can slide vertically is housed in the accumulator chamber 603. The flattened piston 605 is connected to a hydraulic cylinder 607 mounted above the housing 602 via an intermediate member 606. The hydraulic cylinder 607 is mounted on a frame 608 mounted on a top of the housing 602. According to this construction, as the hydraulic cylinder 607 is extended/retracted, the piston 605 is slid vertically in the accumulator chamber 603 so that the resin filled inside is compressed.

A flattened opening 609 is vertically formed in the flattened piston 605 and a planar mandrel 610 extends through the opening 609. A top of the mandrel 610 is connected to an actuator 612 (cylinder mechanism) mounted on the frame 608 via an intermediate member 11 and a flattened core 613 is mounted on a bottom of the mandrel 610 by a bolt. The flattened core 613 has an enlarged diameter, around which a flattened die 614 is provided at prescribed clearance to surround the core. The die 614 is mounted on a lower housing 615 by a plate 616. The lower housing 615 is mounted on the lower end of the housing 602.

According to this construction, as the piston 605 moves up and down to compress the resin in the accumulator chamber 603, the compressed resin is extruded from the clearance between the flattened die 164 and the flattened core 613 in the form of hollow flattened parison 617. In this situation, if the actuator 612 which ascends/descends the mandrel 610 is manipulated to move the core 613 up and down thereby adjusting the clearance (gap) between the die 614 and the core, it is possible to control the thickness (wall thickness) of the extruded flattened parison 617 in the extruding direction.

A feature of this embodiment lies in the following points, as shown in FIG. 23: a plurality of (four) resin passage grooves 618 which communicates right and left faces of the core 613 to each other are formed at the tip of the core 613 in the parison injecting direction in the width direction of the core 613 at intervals, and partition walls 619 are formed in the hollow flattened parison 617 by the resin which pass the resin passage grooves 618 as the parison 617 is injected from the gap between the flattened die 614 and the core 613. Into chambers 617a, b, c, d and e in the hollow flattened parison 617 defined by these partition walls 619, the air is fed from air pipes 620 (blow pin) projecting downward from the bottom of the flattened core 613 so as to perform the air blowing. The air pipes 620 are combined on their upstream sides in the flattened core 613 and the flattened mandrel 610 and connected with air feed means (e.g., air compressor; not shown).

Figure 25:
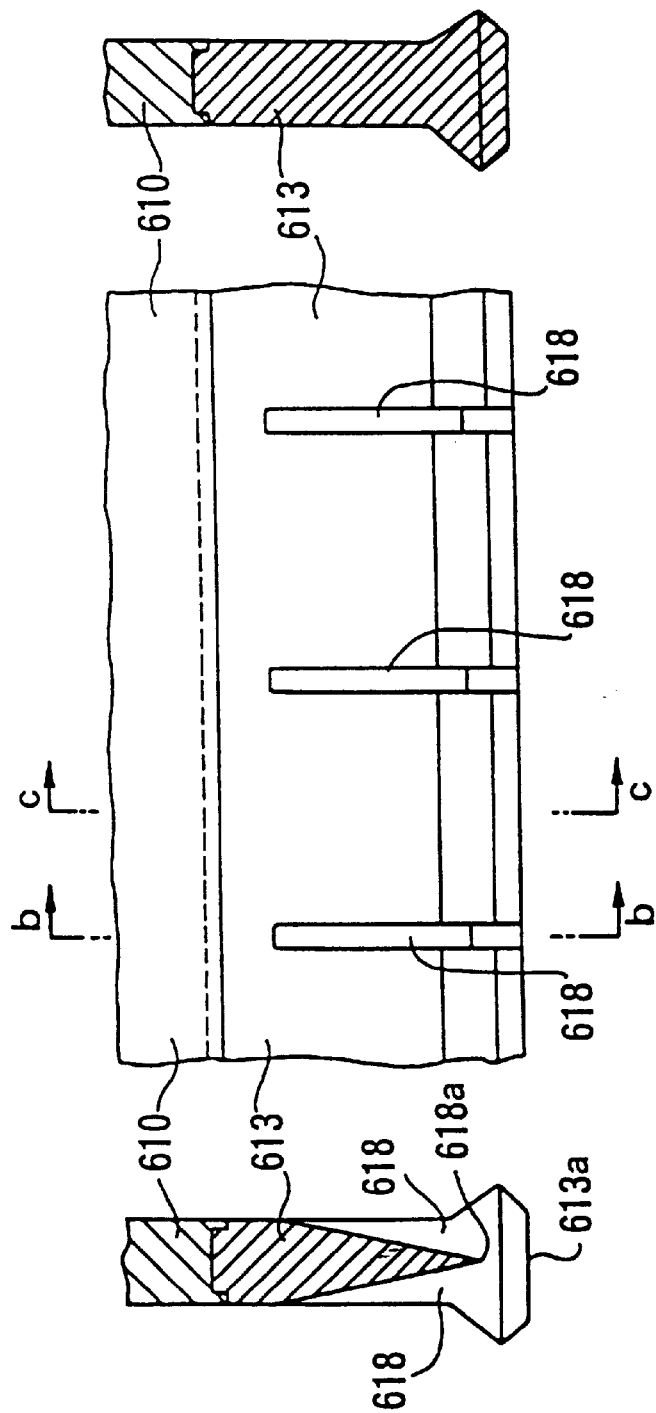
Figure 26:
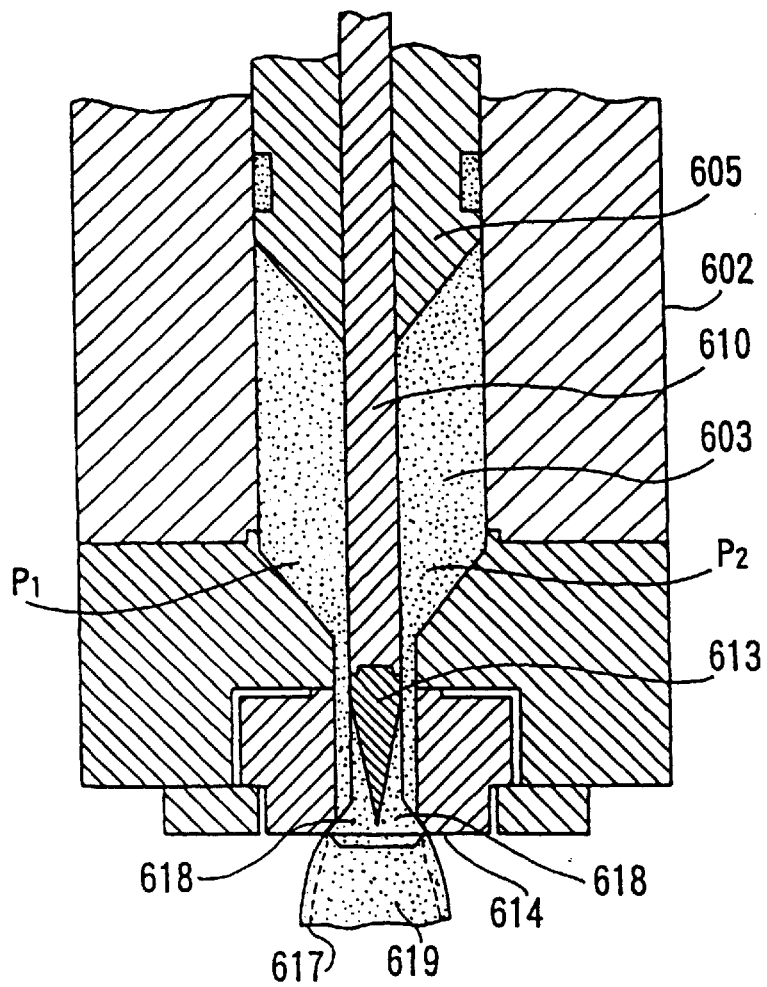
FIG. 26 is an enlarged lateral section of major part of the flat blow molding machine shown in FIG. 23.

A major part of the resin passage grooves 618 is illustrated in FIG. 25. As shown in FIG. 25(b), the resin passage grooves 618 have inner walls facing each other which correspond to the right and left lateral faces of the flattened core 613 to make the section of the flattened core 613 "V". The depth of the groove 618 is enlarged in the direction of injection. The right and left grooves 618 are communicated with each other in the core 613 before reaching the tip of the flattened core 613. Specifically, a peak 618a of the "V" connecting the right and left grooves 618 is positioned above the top face 613a of the flattened core 613. According to this construction, resin P1 on the left face and resin P2 on the right face of the flattened core 613 in the accumulator chamber 603 partially flow in the right and left grooves 618 and join with each other in the flattened core 613 to form the partition walls 619 connecting the right and left lateral faces with each other in the extruded hollow flattened parison 617, as shown in FIG. 26.

Figure 27:
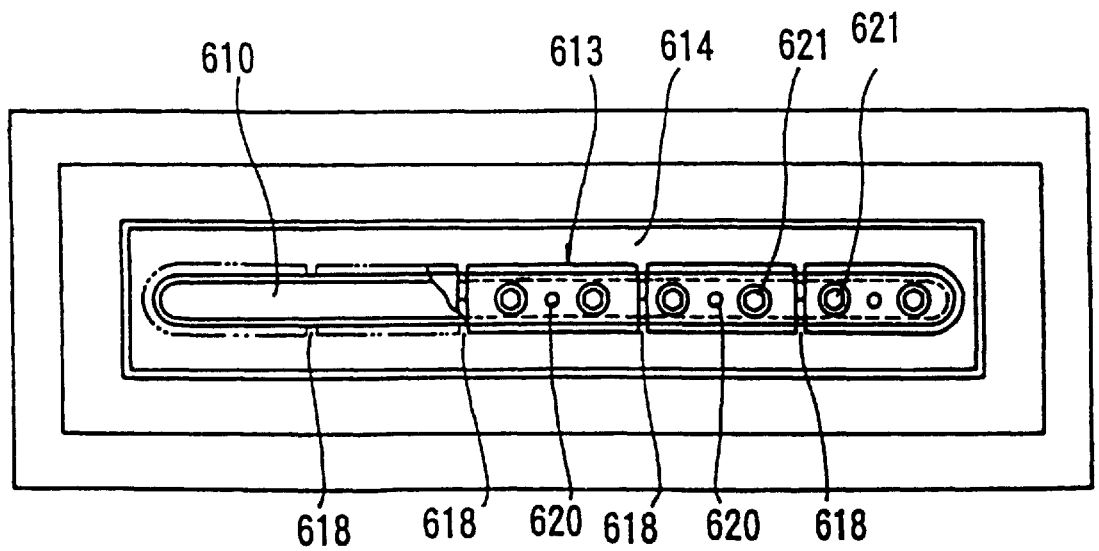
FIG. 27 is a bottom view of the flat blow molding machine shown in FIG. 23.

FIG. 27 is an illustration as the flattened core 613 and the flattened die 614 are viewed from the bottom. As shown, the flattened core 613 is mounted on the tip of the flattened mandrel 610. The tip of the flattened core 613 is slightly larger than the diameter of the opening of the flattened die 614 such that it is possible to adjust the gap between the die 614 and the core 613 as the mandrel 610 is moved up and down. Four resin passage grooves 618 are formed at the tip of the flattened core 613 at prescribed intervals in its width direction. Air pipes 620 are provided at the tips of the five flattened cores 613 divided by the resin passage grooves 618, respectively.

Now, operations of this embodiment having the above described construction will be explained.

As the resin is fed into the accumulator chamber 603 from the extruder 604, the hydraulic cylinder 607 extends to lower the flattened piston 605. Then, the pressed resin is injected downward from the clearance (gap) between the flattened die 614 and the flattened core 613 in the form of hollow flattened parison 617.

In this situation, the resin P1 and P2 divided right and left by the flattened mandrel 610 in the accumulator chamber 603 passes through the clearance between the flattened die 614 and the core 613 to form the right and left walls of the hollow flattened parison 617, as shown in FIG. 26. Then, the parison P1 and P2 passes the resin passage grooves 618 on the right and left lateral faces of the flattened core 613 to join in the flattened core 613. Inside the injected hollow flattened parison, four partition walls 619 are formed connecting the right and left lateral faces. Specifically, inside the hollow flattened parison 617, four partition walls 619 spaced at intervals in the width direction are formed in the direction of injection, as shown in FIG. 23. These partition walls 619 define the five chambers 617a, b, c, d and e in the parison 617.

After that, the hollow flattened parison 617 having the partition walls 619 are sandwiched by metallic molds (not shown) from right and left and air is blown into the chambers 617a, b, c, d and e from the air pipes 620 located at the tip of the flattened core 613. As a result, the chambers 617a, b, c, d and e of the hollow flattened parison 617 are air-blown in the metallic molds to produce a blow molded product.

Figure 28:
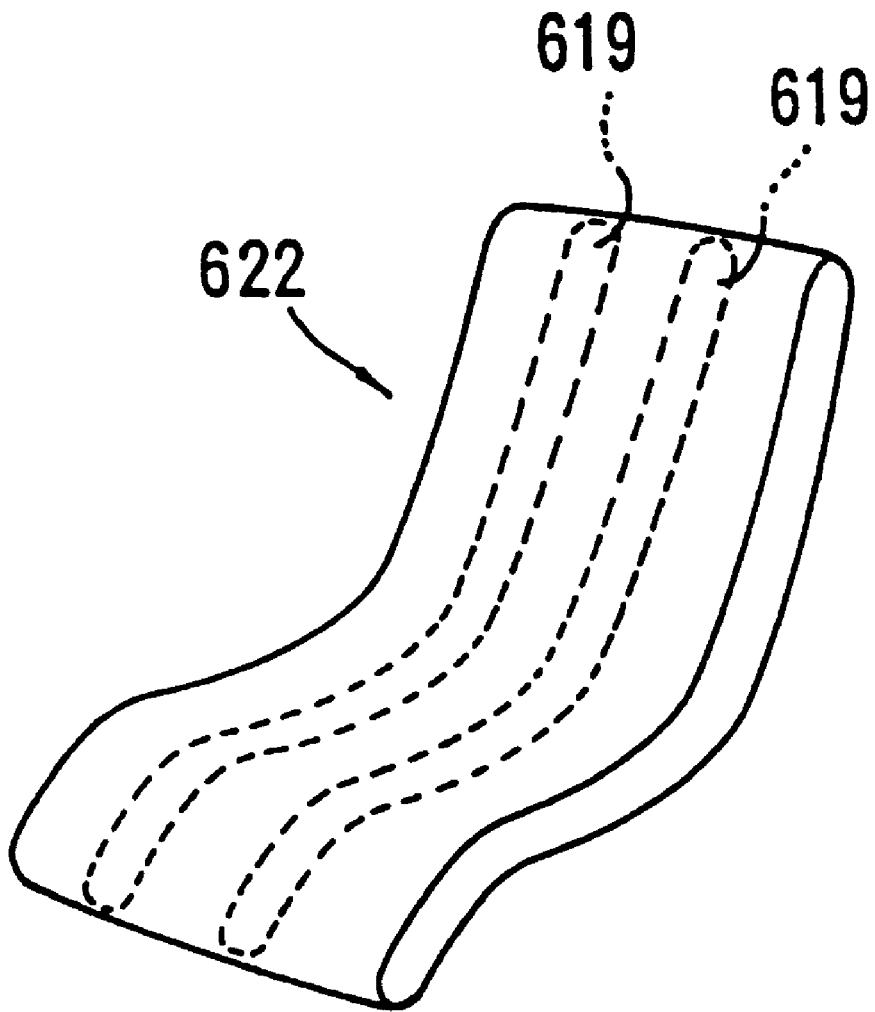
FIG. 28 is a perspective view showing a vehicle seat which is blow molded by the flat blow molding machine shown in FIG. 23.

FIG. 28 shows a seat for an automobile as blow-molded in the above described manner. In this case, the metallic mold sandwiching the injected hollow flattened parison 617 has a shape curved in the injection direction like the seat.

Figure 37:
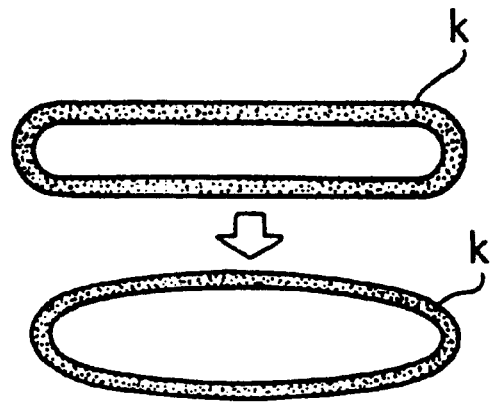
FIG. 37 illustrates how hollow flattened parison expands circularly due to swell effect.

As explained above, according to the apparatus 601 of this embodiment, a plurality of partition walls 619 extending in the injection direction are formed at the intervals in the width direction in the hollow flattened parison 617 injected from the clearance between the flattened core 613 and the flattened die 614 so that the partition walls 619 restrict the deformation of the hollow flattened parison "k" due to the swell effect and drawdown of the injected resin as shown in FIG. 37. Therefore, a sound thin hollow blow molded product 622 is obtained.

Incidentally, if the injected hollow flattened parison 617 has wrinkles, pre-blowing is applied to the chambers 617a, b, c, d and 3 defined by the partition walls 619 to reform or correct these wrinkles. In this case also, the partition walls 619 suppress the expansion/deformation of the hollow flattened parison 617 which tends to expand due to the air pressure of the pre-blowing.

Figure 38:
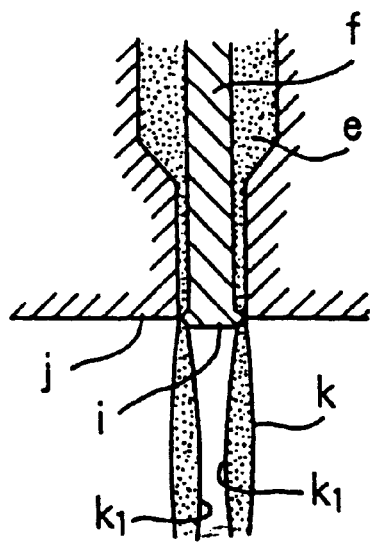
FIG. 38 illustrates how the section of the hollow flattened parison deforms due to the swell effect and drawdown.

In addition, when a flattened die 614 and a core 613, both of which have a large flattened ratio, are employed to inject flattened parison 617 having a large width and a very small thickness, the resin section of the flattened parison "k"

injected as shown in FIG. 38 deforms due to the swell effect and drawdown so that the inner faces k1 of the parison may be fused to each other. This disables the blow molding. In this embodiment, however, the partition walls 619 prevent the fusion between the inner faces K1 of the parison.

(7) Next, an embodiment of a seventh invention will be explained with reference to FIGS. 29–32.

Figure 30:
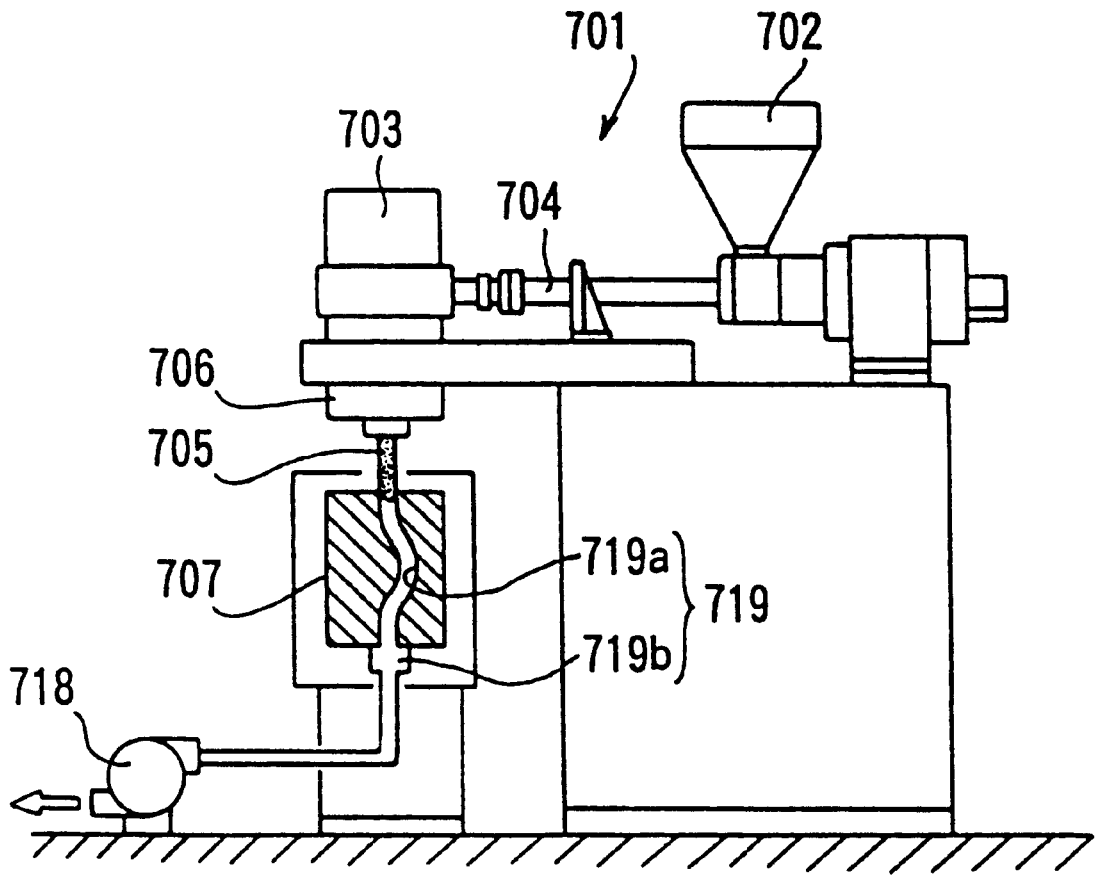
FIG. 30 a schematic view of the curved blow molding machine shown in FIG. 29.

FIG. 30 shows a schematic view of a curved (three dimensional) blow molding machine 701. This blow molding machine 701 includes, as its major parts, a hopper 702 for feeding resin material, an extruder 704 for transferring the resin material from the hopper 702 to a head 703, an injector 706 for injecting the resin downward from the head 703 in the form of hollow circular parison 705 and a metallic mold 707 for sandwiching the injected parison 705.

Figure 29A:
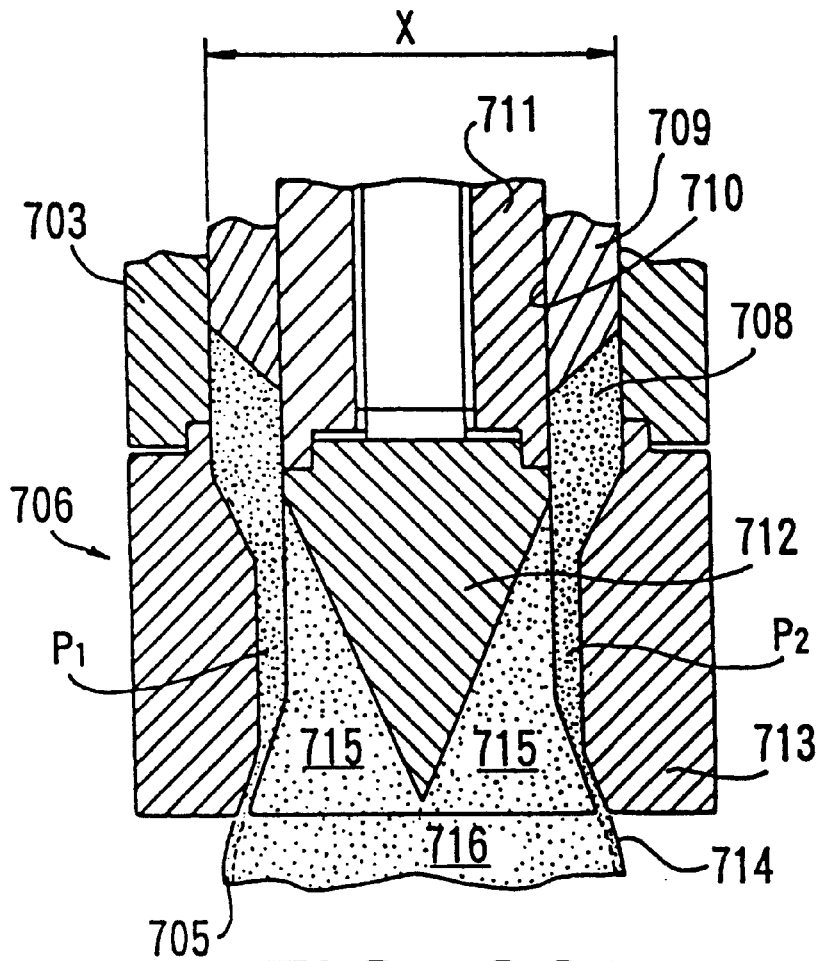
FIG. 29 is a set of views useful to explain a blow molding method according to an embodiment of a seventh invention, in which (a) is a lateral section of major part of a curved (three dimensional) blow molding machine and (b) is a bottom view of the same.

A major part of the injector 706 is illustrated in FIGS. 29(a) and (b). As depicted, an accumulator chamber 708 is formed in the head 703 to receive the resin fed from the extruder 704. The accumulator chamber 708 is shaped like a cylinder extending vertically and having a diameter X. A piston 709 which can move up and down is housed in the accumulator chamber 708 to press the resin downward. The piston 709 is connected with a hydraulic cylinder (not shown) mounted on a top of the head 703 and is moved downward to press the resin as the hydraulic cylinder expands.

A vertically extending cylindrical opening 710 is formed in the piston 709 and a cylindrical mandrel 711 extends through the opening 710. An upper end of the mandrel 711 is connected with an actuator (cylinder mechanism) mounted at a top of the head 703 and a cylindrical core 712 is mounted on a lower end of the mandrel 711. The core 712 has an enlarged tip, around which a cylindrical die 713 is provided to surround the core. The die 713 is mounted on a bottom of the head 703.

According to this construction, as the piston 709 moves up and down to press the resin in the accumulator chamber 708, the pressed resin is extruded from the clearance between the die 713 and the core 712 in the form of hollow circular parison 705. In this situation, if the actuator which ascends and descends the mandrel 711 is manipulated to move the core 712 up and down so as to adjust the clearance 714 (gap) between the core 712 and the die 713, it is possible to control the thickness (wall thickness) of the extruded parison 705 in the direction of extrusion.

A feature of this embodiment lies in a point that resin passage grooves 715 are formed at the tip of the core 712 in the parison injecting direction to connect opposite lateral faces of the core 712 with each other, as shown in FIGS. 29(a) and (b), and partition walls 716 are formed in the hollow circular parison 705 by the resin which passes the resin passage grooves as the parison 705 is injected from the gap 714 between the die 713 and the core 712.

The resin passage grooves 715 are formed on opposite right and left lateral faces of the core 712 and the depth of the resin passage groove 715 becomes larger in the injection direction to make the section of the core 712 "V". The right and left passages 715 are communicated with each other in the core 712 just before reaching the tip of the core 712. According to this construction, part of the resin P1 and P2 on the left and right of the core 712 in the accumulator chamber 708 pass the left and right grooves 715 respectively and join with each other in the core 712 to form the partition walls 716 which semi-circularly divide the interior of the injected hollow circular parison 705, as shown in FIG. 29(a).

Figure 29B:
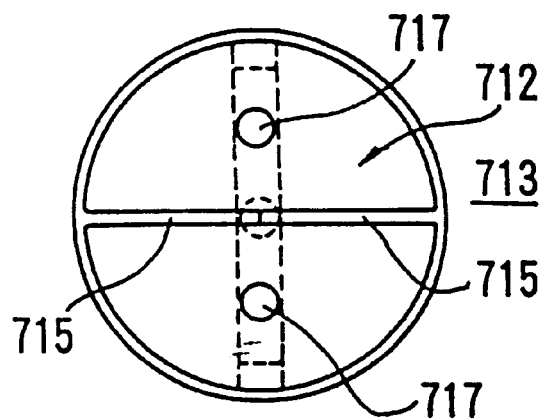

Air is fed into each parison chamber defined by the partition walls 716 from an air pipe 717 (blow pin) projecting downward from the bottom of the core 712 to conduct the air blowing. Specifically, the resin passage grooves 715 are formed in the core 712 situated in the die 713 to semi-circularly divide the core 712, and the air pipes 717 are provided at the tips of these two semi-circular cores 712, as shown in FIG. 29(b). The air pipes 717 are joined with each other at their upstream ends in the core 712 and the mandrel 711 and are connected with air feed means (e.g., air compressor; not shown).

Next, operations of this embodiment having the above described structure will be explained.

As shown in FIG. 30, the resin material fed in the hopper 702 is transferred to the accumulator chamber 708 in the head 703 via the extruder 704. Then, the resin material is compressed by the piston 709 and injected from the clearance 714 between the die 713 and the core 712 in the form of hollow circular parison 705 toward the metallic mold 707 located below. In this situation, part of the resin on the lateral face of the core 12 in the accumulator chamber 708 passes the resin passage grooves 715 formed at the tip of the core and is guided toward the core center to be joined with each other in the core 712 thereby forming the partition walls 716 in the injected hollow circular parison 705, as shown in FIG. 29.

Just before the injection of the parison 716, the metallic mold 707 which is divided into right and left pieces is closed and a blower 718 is activated to suck the air in the metallic mold 707, as shown in FIG. 30. Accordingly, air flow is generated from up and down in a curved (three dimensional) cavity 719a formed vertically in the metallic mold 707. As a result, the hollow circular parison 705 injected in the metallic mold 707 and having the partition walls is guided downward along the configuration of the curved cavity 719a by the air flow in the curved cavity 719a. When the tip of the parison 705 reaches a cavity end 719b, upper and lower shutters (not shown) situated on the upper and lower ends of the metallic mold 707 are closed and the air is blown into the chambers of the parison 705 defined by the partition walls 716 (air blowing). Simultaneously, the blower 718 is deactivated.

Figure 31:
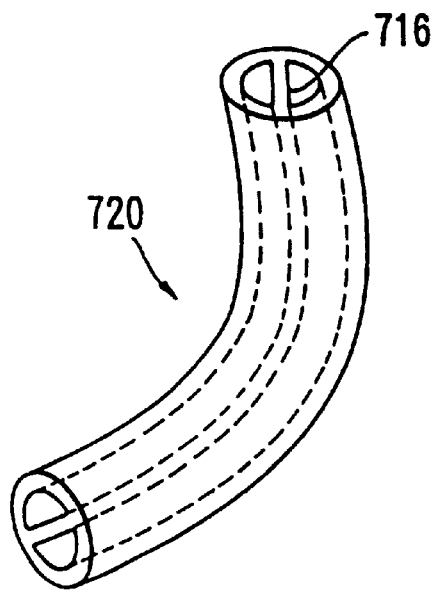
FIG. 31 is a perspective view of a curved blow molded product manufactured by the curved blow molding machine shown in FIG. 29.
Figure 32:
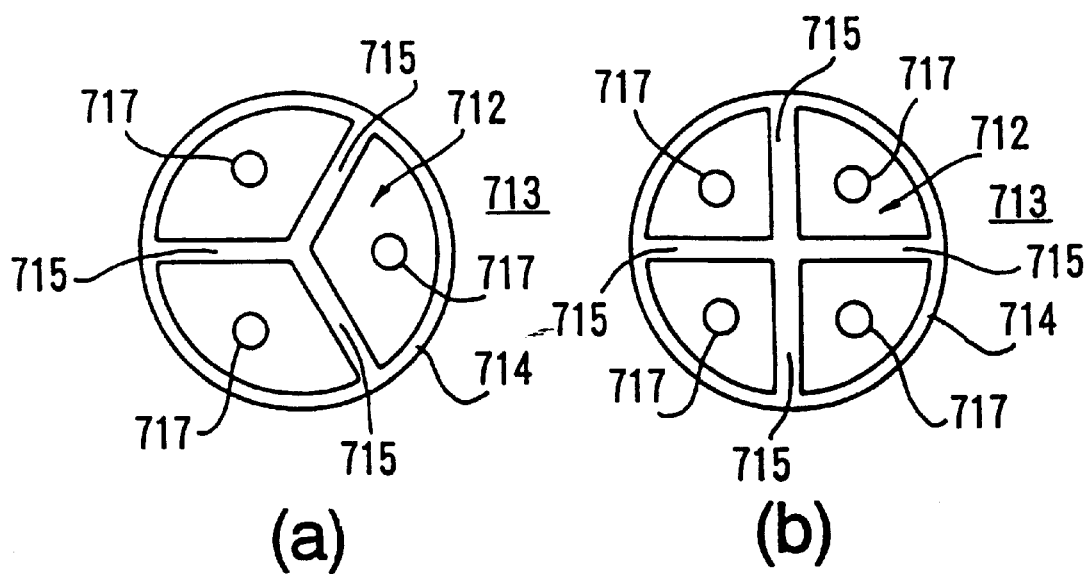
FIG. 32 is a set of views showing modification of the present invention, in which (a) is a bottom view of a core having three resin passage grooves and (b) is a bottom view of a core having four resin passage grooves.

As a result, the chambers of the hollow circular parison 705 are air blown in the metallic mold 707 and this results in a curved blow molded product whose interior is divided in the direction of injection. Finally, the parison 705 in the metallic mold 707 is cooled, and the metallic mold 707 is opened right and left to pick up the product. FIG. 31 shows a pipe-like curved blow molded product 720 as manufactured in the above described manner. As illustrated, the partition walls 716 are formed in the product 720 to divide the interior in the longitudinal direction.

As described above, according to the method of this embodiment, it is not necessary to use a multi-injection head so that the molding machine can be designed compact as a whole as compared with a conventional molding machine having a multi-injection head. Further, since a groove-trace which is conventionally formed as a pushing plate is drawn out of the parison is not formed, strength and appearance of the product are improved. In addition, if the product 720 shown in FIG. 31 is compared with a bundle of pipes having the same function as the product 720, it will be understood that the product 720 can save the space.

Three or four resin passage grooves 715 may be formed radiantly at the tip of the core 712, as shown in FIGS. 32(a) and (b), and the air pipes 717 may be mounted at the lower face of the core divided by these resin passage grooves 715. In this case, a resulting blow molded product will have three or four chambers.

In this embodiment, the curved (three dimensional) cavity 719a is formed in the metallic mold 707, as shown in FIG. 30, such that a curved (three dimensional) product 720 is obtained, as shown in FIG. 31. However, the embodiment is not limited to the disclosed example. For instance, a straight cavity may be formed in the metallic mold 707 to manufacture a straight product.

APPLICABILITY IN INDUSTRY

As described above, the present invention is suitable for application to a flat blow molding machine, a flat blow molding method and a product of flat blow molding.

We claim:

1. Apparatus for forming a hollow parison having a flattened annular cross section, comprising:
    a substantially vertically extending main body;
    means for feeding a thermoplastic material into the main body;
    a mandrel placed in the main body, the mandrel extending substantially vertically and having a bottom;
    a movable piston positioned over the mandrel in the main body for downwardly pressing the thermoplastic material;
    a core located at the bottom of the mandrel, the core including a first semicircular end member, a second semicircular end member and a first rectangular member, the first and second end members being connected to opposite ends of the first rectangular member to define a first flattened oval shape, the first rectangular member having a longitudinal direction extending substantially horizontally, a second rectangular member having a different shape than the first rectangular member which is interchangeable with the first rectangular member and fit together with the semi-circular end core members to change the width of the parison, both the first and second semicircular end members and the first rectangular member being detachably mounted on the bottom of the mandrel, the first rectangular member being only replaced when the first flattened oval shape is elongated or shrunk in the longitudinal direction of the rectangular member;
    a die having an inner surface of a second flattened oval shape, the die being placed around the core such that a flattened annular gap is formed between the inner surface of the die and the core and the hollow parison having the flattened annular cross section is extruded through the gap upon downward movement of the piston, the die including movable members to elongate or shrink the second flattened oval shape upon elongation or shrinkage of the first flattened oval shape; and
    actuator means for moving each of the movable members.

2. An apparatus for forming a hollow parison having a flattened annular cross section, comprising:
    a main body having a longitudinal direction and an inner surface, the inner surface having a first flattened oval shape in cross section;
    a mandrel placed in the main body and extending in the longitudinal direction of the main body, the mandrel having a bottom and a second flattened oval shape in cross section;
    a chamber defined in the main body between the inner surface of the main body and the mandrel, the chamber having a first flattened annular shape in cross section and receiving a thermoplastic material therein;
    means for feeding the thermoplastic material into the chamber;
    a piston placed between the inner surface of the main body and the mandrel and movable in the longitudinal direction of the main body to press the thermoplastic material in the chamber during an extrusion operation;
    a core mounted on the bottom of the mandrel, the core including a first semicircular end member, a second semicircular end member and a first rectangular member being connected to the first and second members at their opposite ends, a second rectangular member having a different shape than the first rectangular member which is interchangeable with the first rectangular member and fit together with the semi-circular end core members to change the width of the parison, all of the members being removable from the bottom of the mandrel and arranged in a first direction perpendicular to the longitudinal direction of the main body to define a third flattened oval shape, the first rectangular member being only replaced when the third flattened oval shape is to be elongated or shrunk in the first direction;
    a die having an inner surface of a fourth flattened oval shape and placed around the core with a second flattened annular gap being formed between the inner surface of the die and the core so that the hollow parison having the flattened annular cross section is extruded through the gap, the die including members movable in the first direction to elongate or shrink the fourth flattened oval shape based on elongation or shrinkage of the third flattened oval shape; and,
    actuator means for moving each of the movable members.

3. The apparatus of claim 2, wherein the first semicircular end member, the second semicircular end member and the first rectangular member are mounted on the bottom of the mandrel by bolts.

4. Apparatus for forming a hollow parison having a flattened annular cross section, comprising:
    a substantially vertically extending main body;
    means for feeding a thermoplastic material into the main body;
    a piston placed in the main body for downwardly pressing the thermoplastic material;
    a mandrel placed in the main body, the mandrel extending substantially vertically and having a bottom;
    a core located at the bottom of the mandrel, the core including a first semicircular end member, a second semicircular end member and a rectangular member, the first and second end members being connected to opposite ends of the rectangular member to define a first flattened oval shape, the rectangular member having a longitudinal direction extending substantially horizontally, both the first and second semicircular end members and the rectangular member being detachably mounted on the bottom of the mandrel, the rectangular member being only replaced when the first flattened oval shape is elongated or shrunk in the longitudinal direction of the rectangular member;
    a die having an inner surface of a second flattened oval shape, the die being placed around the core such that a flattened annular gap is formed between the inner surface of the die and the core and the hollow parison having the flattened annular cross section is extruded through the gap upon downward movement of the piston, the die including movable members to elongate or shrink the second flattened oval shape upon manual elongation or shrinkage of the first flattened oval shape; and
    actuator means for moving each of the movable members.

5. Apparatus for forming a hollow parison having a flattened annular cross section, comprising;

a substantially vertically extending main body;

means for feeding a thermoplastic material into the main body;

a piston placed in the main body for downwardly pressing the thermoplastic material;

a mandrel placed in the main body, the mandrel extending substantially vertically and having a bottom;

a core located at the bottom of the mandrel, the core including a first semicircular end member, a second semicircular end member and a first rectangular member connected to the first and second end members at their opposite ends to define a first flattened oval shape, the first rectangular member having a longitudinal direction extending substantially horizontally, the first rectangular member being only replaced when the first flattened oval shape is elongated or shrunk in the longitudinal direction of the first rectangular member;

said first and second semi-circular end members being slidable in the longitudinal direction for repositioning the end core members upon replacement of said first rectangular member with a second rectangular member of different shape to change the width of the parison, and a die having an inner surface of a second flattened oval shape, the die being placed around the core such that a flattened annular gap is formed between the inner surface of the die and the core and the hollow parison having the flattened annular cross section is extruded through the gap, the die including movable members to elongate or shrink the second flattened oval shape upon elongation or shrinkage of the first flattened oval shape; and actuator means for moving each of the movable members.

6. The apparatus of claim 1, wherein the first semicircular end member, the second semicircular end member and the first rectangular member are mounted on the bottom of the mandrel by bolts.

* * * * *